US00RE44689E

(19) United States
(12) Reissued Patent
Wendell et al.

(10) Patent Number: US RE44,689 E
(45) Date of Reissued Patent: Jan. 7, 2014

(54) OPTICAL COIN DISCRIMINATION SENSOR AND COIN PROCESSING SYSTEM USING THE SAME

(75) Inventors: David J. Wendell, Willow Springs, IL (US); John R. Blake, St. Charles, IL (US); Joseph J. Geib, The Villages, FL (US); John C. Peklo, Lombard, IL (US); Richard A. Mazur, Palatine, IL (US); David J. Mecklenburg, Glendale Heights, IL (US)

(73) Assignee: Cummins-Allison Corp., Mt. Prospect, IL (US)

(21) Appl. No.: 13/538,512

(22) Filed: Jun. 29, 2012

Related U.S. Patent Documents

Reissue of:
(64) Patent No.: 7,743,902
Issued: Jun. 29, 2010
Appl. No.: 10/798,669
Filed: Mar. 11, 2004

U.S. Applications:
(63) Continuation-in-part of application No. 10/095,164, filed on Mar. 11, 2002, now Pat. No. 6,755,730, and a continuation-in-part of application No. 10/095,256, filed on Mar. 11, 2002, now Pat. No. 6,892,871.

(51) Int. Cl.
*G07D 7/00* (2006.01)

(52) U.S. Cl.
USPC ..... 194/302; 453/57

(58) Field of Classification Search
USPC ..... 194/302, 334; 73/163; 359/227; 356/614, 635, 640; 453/4
See application file for complete search history.

(56) References Cited

U.S. PATENT DOCUMENTS

| | | | | |
|---|---|---|---|---|
| 2,570,920 | A | 10/1951 | Clough et al. | 232/16 |
| 2,669,998 | A | 2/1954 | Buchholz | 133/8 |
| 2,750,949 | A | 6/1956 | Kulo et al. | 133/8 |
| 2,835,260 | A | 5/1958 | Buchholz | 133/8 |
| 2,865,561 | A | 12/1958 | Rosapepe | 232/7 |

(Continued)

FOREIGN PATENT DOCUMENTS

| | | | | |
|---|---|---|---|---|
| CA | 2235925 | C | 11/1995 | G07D 9/00 |
| CA | 2189330 | C | 12/2000 | G07F 17/42 |

(Continued)

OTHER PUBLICATIONS

Amiel Industries: AI-1500 'Pulsar' High Performance Sorting and Bagging Machine, 13 pages (date unknown, but prior to Dec. 14, 2000).

(Continued)

*Primary Examiner* — Mark Beauchaine
(74) *Attorney, Agent, or Firm* — Nixon Peabody LLP

(57) ABSTRACT

According to one embodiment of the present invention, a method for determining the denomination of a coin with a disk-type coin processing system comprises moving a coin along a coin path with a rotatable disk, generating an encoder pulse for each incremental movement of the rotatable disk, directing a light beam transverse the coin path, detecting the light beam with a light detector, developing a signal at the light detector indicating the presence of a coin in the coin path, counting a number of encoder pulses occurring while developing the signal at the light detector, and comparing the counted number of encoder pulses to a plurality of stored numbers of encoder pulses corresponding to the particular coin denominations.

34 Claims, 17 Drawing Sheets

(56) References Cited

U.S. PATENT DOCUMENTS

| | | | | |
|---|---|---|---|---|
| 3,132,654 | A | 5/1964 | Adams | 133/1 |
| 3,376,970 | A | 4/1968 | Roseberg | 198/40 |
| 3,771,583 | A | 11/1973 | Bottemiller | 160/327 |
| 3,778,595 | A | 12/1973 | Hatanaka et al. | 235/61.7 B |
| 3,916,922 | A | 11/1975 | Prumm | 133/3 R |
| 3,998,237 | A | 12/1976 | Kressin | 133/3 A |
| 3,998,376 | A | 12/1976 | Myers et al. | 229/33 |
| 4,050,218 | A | 9/1977 | Call | 53/167 |
| 4,059,122 | A | 11/1977 | Kinoshita | 133/3 D |
| 4,075,460 | A | 2/1978 | Gorgens | 235/420 |
| 4,124,111 | A | 11/1978 | Hayashi | 194/102 |
| 4,150,740 | A | 4/1979 | Douno | 194/4 C |
| 4,166,945 | A | 9/1979 | Inoyama et al. | 235/379 |
| 4,172,462 | A | 10/1979 | Uchida et al. | 133/3 A |
| 4,179,685 | A | 12/1979 | O'Maley | 340/146.3 H |
| 4,179,723 | A | 12/1979 | Spencer | 361/384 |
| 4,184,366 | A | 1/1980 | Butler | 73/163 |
| 4,197,986 | A | 4/1980 | Nagata | 235/379 |
| 4,208,549 | A | 6/1980 | Polillo et al. | 179/6.3 R |
| 4,228,812 | A | 10/1980 | Marti | 133/3 F |
| 4,232,295 | A | 11/1980 | McConnell | 340/152 R |
| 4,234,003 | A | 11/1980 | Ristvedt et al. | 133/3 |
| 4,249,552 | A | 2/1981 | Margolin et al. | 133/1 R |
| 4,251,867 | A | 2/1981 | Uchida et al. | 364/408 |
| 4,286,703 | A | 9/1981 | Schuller et al. | 194/100 A |
| RE30,773 | E | 10/1981 | Glaser et al. | 235/379 |
| 4,310,885 | A | 1/1982 | Azcua et al. | 364/405 |
| 4,317,957 | A | 3/1982 | Sendrow | 178/22.08 |
| 4,341,951 | A | 7/1982 | Benton | 235/379 |
| 4,355,369 | A | 10/1982 | Garvin | 364/900 |
| 4,360,034 | A | 11/1982 | Davila et al. | 133/3 D |
| 4,369,442 | A | 1/1983 | Werth et al. | 340/825.35 |
| 4,380,316 | A | 4/1983 | Glinka et al. | 232/16 |
| 4,383,540 | A | 5/1983 | DeMeyer et al. | 133/3 H |
| 4,385,285 | A | 5/1983 | Horst et al. | 382/3 |
| 4,412,292 | A | 10/1983 | Sedam et al. | 364/479 |
| 4,416,299 | A | 11/1983 | Bergman | 133/1 R |
| 4,417,136 | A | 11/1983 | Rushby et al. | 235/379 |
| 4,423,316 | A | 12/1983 | Sano et al. | 235/379 |
| 4,434,359 | A | 2/1984 | Watanabe | 235/379 |
| 4,436,103 | A | 3/1984 | Dick | 133/3 D |
| 4,454,414 | A | 6/1984 | Benton | 235/379 |
| 4,474,197 | A | 10/1984 | Kinoshita et al. | 133/4 A |
| 4,488,116 | A | 12/1984 | Plesko | 324/236 |
| 4,531,531 | A | 7/1985 | Johnson et al. | 133/3 |
| 4,543,969 | A | 10/1985 | Rasmussen | 133/3 |
| 4,549,561 | A | 10/1985 | Johnson et al. | 133/3 |
| 4,556,140 | A | 12/1985 | Okada | 194/4 C |
| 4,558,711 | A | 12/1985 | Yoshiaki et al. | 133/3 F |
| 4,564,036 | A | 1/1986 | Ristvedt | 133/3 |
| 4,570,655 | A | 2/1986 | Raterman | 133/3 |
| 4,594,664 | A | 6/1986 | Hashimoto | 364/405 |
| 4,602,332 | A | 7/1986 | Hirose et al. | 364/408 |
| 4,607,649 | A | 8/1986 | Taipale et al. | 133/3 C |
| 4,620,559 | A | 11/1986 | Childers et al. | 133/3 R |
| 4,641,239 | A | 2/1987 | Takesako | 364/408 |
| 4,674,260 | A | 6/1987 | Rasmussen et al. | 53/212 |
| 4,681,128 | A | 7/1987 | Ristvedt et al. | 453/6 |
| 4,705,154 | A | 11/1987 | Masho et al. | 194/319 |
| 4,718,218 | A | 1/1988 | Ristvedt | 53/532 |
| 4,731,043 | A | 3/1988 | Ristvedt et al. | 453/6 |
| 4,733,765 | A | 3/1988 | Watanabe | 194/206 |
| 4,749,074 | A | 6/1988 | Ueki et al. | 194/317 |
| 4,753,624 | A | 6/1988 | Adams et al. | 453/10 |
| 4,753,625 | A | 6/1988 | Okada | 453/32 |
| 4,765,464 | A | 8/1988 | Ristvedt | 206/0.82 |
| 4,766,548 | A | 8/1988 | Cedrone et al. | 364/479 |
| 4,775,353 | A | 10/1988 | Childers et al. | 453/6 |
| 4,775,354 | A | 10/1988 | Rasmussen et al. | 453/10 |
| 4,778,983 | A | 10/1988 | Ushikubo | 235/381 |
| 4,803,347 | A | 2/1989 | Sugahara et al. | 235/379 |
| 4,804,830 | A | 2/1989 | Miyagisima et al. | 235/379 |
| 4,812,629 | A | 3/1989 | O'Neil et al. | 235/383 |
| 4,839,505 | A | 6/1989 | Bradt et al. | 235/381 |
| 4,844,369 | A | 7/1989 | Kanayachi | 242/56 R |
| 4,848,556 | A | 7/1989 | Shah et al. | 194/212 |
| 4,863,414 | A | 9/1989 | Ristvedt et al. | 453/6 |
| 4,883,158 | A | 11/1989 | Kobayashi et al. | 194/217 |
| 4,884,212 | A | 11/1989 | Stutsman | 364/479 |
| 4,900,909 | A | 2/1990 | Nagashima et al. | 235/487 |
| 4,908,516 | A | 3/1990 | West | 250/556 |
| 4,921,463 | A | 5/1990 | Primdahl et al. | 453/3 |
| 4,936,435 | A | 6/1990 | Griner | 194/317 |
| 4,953,086 | A | 8/1990 | Fukatsu | 364/408 |
| 4,954,697 | A | 9/1990 | Kokubun et al. | 235/381 |
| 4,964,495 | A | 10/1990 | Rasmussen | 194/344 |
| 4,966,570 | A | 10/1990 | Ristvedt et al. | 453/6 |
| 4,970,655 | A | 11/1990 | Winn et al. | 364/479 |
| 4,971,187 | A | 11/1990 | Furuya et al. | 194/318 |
| 4,988,849 | A | 1/1991 | Sasaki et al. | 235/379 |
| 4,992,647 | A | 2/1991 | Konishi et al. | 235/379 |
| 4,995,848 | A | 2/1991 | Goh | 453/3 |
| 5,009,627 | A | 4/1991 | Rasmussen | 453/10 |
| 5,010,238 | A | 4/1991 | Kadono et al. | 235/379 |
| 5,010,485 | A | 4/1991 | Bigari | 364/408 |
| 5,011,455 | A | 4/1991 | Rasmussen | 453/10 |
| 5,022,889 | A | 6/1991 | Ristvedt et al. | 453/6 |
| 5,025,139 | A | 6/1991 | Halliburton, Jr. | 235/379 |
| 5,026,320 | A | 6/1991 | Rasmussen | 453/6 |
| 5,031,098 | A | 7/1991 | Miller et al. | 364/405 |
| 5,033,602 | A | 7/1991 | Saarinen et al. | 194/334 |
| 5,039,848 | A | 8/1991 | Stoken | 235/381 |
| 5,055,086 | A | 10/1991 | Raterman et al. | 453/10 |
| 5,055,657 | A | 10/1991 | Miller et al. | 235/381 |
| 5,064,999 | A | 11/1991 | Okamoto et al. | 235/379 |
| 5,080,633 | A | 1/1992 | Ristvedt et al. | 435/6 |
| 5,091,713 | A | 2/1992 | Horne et al. | 340/541 |
| 5,104,353 | A | 4/1992 | Ristvedt et al. | 453/6 |
| 5,105,601 | A | 4/1992 | Horiguchi et al. | 53/465 |
| 5,106,338 | A | 4/1992 | Rasmussen et al. | 453/10 |
| 5,111,927 | A | 5/1992 | Schulze | 194/209 |
| 5,114,381 | A | 5/1992 | Ueda et al. | 453/57 |
| 5,120,945 | A | 6/1992 | Nishibe et al. | 235/379 |
| 5,123,873 | A | 6/1992 | Rasmussen | 453/10 |
| 5,129,205 | A | 7/1992 | Rasmussen | 53/52 |
| 5,135,435 | A | 8/1992 | Rasmussen | 453/56 |
| 5,140,517 | A | 8/1992 | Nagata et al. | 364/408 |
| 5,141,443 | A | 8/1992 | Rasmussen et al. | 453/10 |
| 5,141,472 | A | 8/1992 | Todd et al. | 453/10 |
| 5,145,455 | A | 9/1992 | Todd | 453/6 |
| 5,146,067 | A | 9/1992 | Sloan et al. | 235/381 |
| 5,154,272 | A | 10/1992 | Nishiumi et al. | 194/318 |
| 5,163,866 | A | 11/1992 | Rasmussen | 453/10 |
| 5,163,867 | A | 11/1992 | Rasmussen | 453/10 |
| 5,163,868 | A | 11/1992 | Adams et al. | 453/11 |
| 5,167,313 | A | 12/1992 | Dobbins et al. | 194/317 |
| 5,175,416 | A | 12/1992 | Mansvelt et al. | 235/379 |
| 5,176,565 | A | 1/1993 | Ristvedt et al. | 453/6 |
| 5,179,517 | A | 1/1993 | Sarbin et al. | 364/410 |
| 5,183,142 | A | 2/1993 | Latchinian et al. | 194/206 |
| 5,184,709 | A | 2/1993 | Nishiumi et al. | 194/318 |
| 5,194,037 | A | 3/1993 | Jones et al. | 453/10 |
| 5,197,919 | A | 3/1993 | Geib et al. | 453/10 |
| 5,205,780 | A | 4/1993 | Rasmussen | 453/10 |
| 5,207,784 | A | 5/1993 | Schwartzendruber | 221/6 |
| 5,209,696 | A | 5/1993 | Rasmussen et al. | 453/10 |
| 5,236,071 | A | 8/1993 | Lee | 194/200 |
| 5,243,174 | A | 9/1993 | Veeneman et al. | 235/381 |
| 5,251,738 | A | 10/1993 | Dabrowski | 194/206 |
| 5,252,811 | A | 10/1993 | Henochowicz et al. | 235/379 |
| 5,253,167 | A | 10/1993 | Yoshida et al. | 364/408 |
| 5,263,566 | A | 11/1993 | Nara et al. | 194/318 |
| 5,265,874 | A | 11/1993 | Dickinson et al. | 273/138 A |
| 5,268,561 | A | 12/1993 | Kimura et al. | 235/384 |
| 5,277,651 | A | 1/1994 | Rasmussen et al. | 453/10 |
| 5,282,127 | A | 1/1994 | Mii | 364/130 |
| 5,286,226 | A | 2/1994 | Rasmussen | 453/10 |
| 5,286,954 | A | 2/1994 | Sato et al. | 235/379 |
| 5,291,003 | A | 3/1994 | Avnet et al. | 235/381 |
| 5,291,560 | A | 3/1994 | Daugman | 382/2 |
| 5,293,981 | A | 3/1994 | Abe et al. | 194/345 |
| 5,297,030 | A | 3/1994 | Vassigh et al. | 364/405 |
| 5,297,598 | A | 3/1994 | Rasmussen | 141/314 |
| 5,297,986 | A | 3/1994 | Ristvedt et al. | 453/6 |

(56) References Cited

U.S. PATENT DOCUMENTS

| | | | | |
|---|---|---|---|---|
| 5,299,977 | A | 4/1994 | Mazur et al. | 453/10 |
| 5,324,922 | A | 6/1994 | Roberts | 235/375 |
| 5,326,104 | A | 7/1994 | Pease et al. | 273/138 A |
| 5,370,575 | A | 12/1994 | Geib et al. | 453/3 |
| 5,372,542 | A | 12/1994 | Geib et al. | 453/10 |
| 5,374,814 | A | 12/1994 | Kako et al. | 235/379 |
| 5,379,344 | A | 1/1995 | Larson et al. | 380/23 |
| 5,379,875 | A | 1/1995 | Shames et al. | 194/317 |
| 5,382,191 | A | 1/1995 | Rasmussen | 453/11 |
| 5,390,776 | A | 2/1995 | Thompson | 194/346 |
| 5,401,211 | A | 3/1995 | Geib et al. | 453/10 |
| 5,404,986 | A | 4/1995 | Hossfield et al. | 194/317 |
| 5,410,590 | A | 4/1995 | Blood et al. | 379/147 |
| RE34,934 | E | 5/1995 | Raterman et al. | 453/10 |
| 5,425,669 | A | 6/1995 | Geib et al. | 453/10 |
| 5,429,550 | A | 7/1995 | Mazur et al. | 453/10 |
| 5,440,108 | A | 8/1995 | Tran et al. | 235/381 |
| 5,450,938 | A | 9/1995 | Rademacher | 194/206 |
| 5,453,047 | A | 9/1995 | Mazur et al. | 453/10 |
| 5,468,182 | A | 11/1995 | Geib | 453/10 |
| 5,470,079 | A | 11/1995 | LeStrange et al. | 273/138 A |
| 5,474,495 | A | 12/1995 | Geib et al. | 453/3 |
| 5,474,497 | A | 12/1995 | Jones et al. | 453/17 |
| 5,480,348 | A | 1/1996 | Mazur et al. | 453/10 |
| 5,489,237 | A | 2/1996 | Geib et al. | 453/12 |
| 5,500,514 | A | 3/1996 | Veeneman et al. | 235/381 |
| 5,501,631 | A | 3/1996 | Mennie et al. | 453/3 |
| 5,507,379 | A | 4/1996 | Mazur et al. | 194/318 |
| 5,514,034 | A | 5/1996 | Jones et al. | 453/10 |
| 5,520,577 | A | 5/1996 | Rasmussen | 453/56 |
| 5,538,468 | A | 7/1996 | Ristvedt et al. | 453/3 |
| 5,542,880 | A | 8/1996 | Geib et al. | 453/10 |
| 5,542,881 | A | 8/1996 | Geib | 453/10 |
| 5,553,320 | A | 9/1996 | Matsuura et al. | 235/379 |
| 5,559,887 | A | 9/1996 | Davis et al. | 380/24 |
| 5,564,546 | A | 10/1996 | Molbak et al. | 194/216 |
| 5,564,974 | A | 10/1996 | Mazur et al. | 453/10 |
| 5,564,978 | A | 10/1996 | Jones et al. | 453/17 |
| 5,570,465 | A | 10/1996 | Tsakanikas | 395/114 |
| 5,573,457 | A | 11/1996 | Watts et al. | 453/31 |
| 5,584,758 | A | 12/1996 | Geib | 453/10 |
| 5,592,377 | A | 1/1997 | Lipkin | 395/242 |
| 5,602,933 | A | 2/1997 | Blackwell et al. | 382/116 |
| 5,620,079 | A | 4/1997 | Molbak | 194/217 |
| 5,623,547 | A | 4/1997 | Jones et al. | 380/24 |
| 5,625,562 | A | 4/1997 | Veeneman et al. | 364/479.05 |
| 5,630,494 | A | 5/1997 | Strauts | 194/317 |
| 5,641,050 | A | 6/1997 | Smith et al. | 194/210 |
| 5,650,605 | A | 7/1997 | Morioka et al. | 235/379 |
| 5,650,761 | A | 7/1997 | Gomm et al. | 235/381 |
| 5,652,421 | A | 7/1997 | Veeneman et al. | 235/381 |
| 5,665,952 | A | 9/1997 | Ziarno | 235/380 |
| 5,679,070 | A | 10/1997 | Ishida et al. | 453/41 |
| 5,684,597 | A | 11/1997 | Hossfield et al. | 356/384 |
| 5,696,366 | A | 12/1997 | Ziarno | 235/380 |
| 5,743,373 | A | 4/1998 | Strauts | 194/318 |
| 5,746,299 | A | 5/1998 | Molbak et al. | 194/200 |
| 5,774,874 | A | 6/1998 | Veeneman et al. | 705/27 |
| 5,782,686 | A | 7/1998 | Geib et al. | 453/10 |
| 5,799,767 | A | 9/1998 | Molbak | 194/217 |
| 5,813,510 | A | 9/1998 | Rademacher | 194/206 |
| 5,823,315 | A | 10/1998 | Hoffman et al. | 194/203 |
| 5,830,054 | A | 11/1998 | Petri | 453/5 |
| 5,838,812 | A | 11/1998 | Pare, Jr. et al. | 382/115 |
| 5,842,188 | A | 11/1998 | Ramsey et al. | 705/416 |
| 5,842,916 | A | 12/1998 | Gerrity et al. | 453/57 |
| 5,850,076 | A | 12/1998 | Morioka et al. | 235/379 |
| 5,854,581 | A | 12/1998 | Mori et al. | 235/379 |
| 5,865,673 | A | 2/1999 | Geib et al. | 453/10 |
| 5,880,444 | A | 3/1999 | Shibata et al. | 235/379 |
| 5,892,211 | A | 4/1999 | Davis et al. | 235/380 |
| 5,892,827 | A | 4/1999 | Beach et al. | 380/24 |
| 5,909,793 | A | 6/1999 | Beach et al. | 194/210 |
| 5,909,794 | A | 6/1999 | Molbak et al. | 194/216 |
| 5,913,399 | A | 6/1999 | Takemoto et al. | 194/200 |
| 5,918,748 | A | 7/1999 | Clark et al. | 209/534 |
| 5,940,623 | A | 8/1999 | Watts et al. | 395/712 |
| 5,944,600 | A | 8/1999 | Zimmermann | 435/10 |
| 5,951,476 | A | 9/1999 | Beach et al. | 600/437 |
| 5,957,262 | A | 9/1999 | Molbak et al. | 194/200 |
| 5,988,348 | A | 11/1999 | Martin et al. | 194/317 |
| 5,995,949 | A | 11/1999 | Morioka et al. | 705/43 |
| 5,997,395 | A | 12/1999 | Geib et al. | 453/10 |
| 6,017,270 | A | 1/2000 | Ristvedt et al. | 453/5 |
| 6,021,883 | A | 2/2000 | Casanova et al. | 194/217 |
| 6,032,859 | A | 3/2000 | Muehlberger et al. | 235/449 |
| 6,039,644 | A | 3/2000 | Geib et al. | 453/10 |
| 6,039,645 | A | 3/2000 | Mazur | 453/10 |
| 6,042,470 | A | 3/2000 | Geib et al. | 453/10 |
| 6,047,807 | A | 4/2000 | Molbak | 194/217 |
| 6,047,808 | A | 4/2000 | Neubarth et al. | 194/317 |
| 6,056,104 | A | 5/2000 | Neubarth et al. | 194/317 |
| 6,080,056 | A | 6/2000 | Karlsson | 453/3 |
| 6,082,519 | A | 7/2000 | Martin et al. | 194/350 |
| 6,086,471 | A | 7/2000 | Zimmermann | 453/3 |
| 6,095,313 | A | 8/2000 | Molbak et al. | 194/344 |
| 6,116,402 | A | 9/2000 | Beach et al. | 194/216 |
| 6,131,625 | A | 10/2000 | Casanova et al. | 141/314 |
| 6,139,418 | A | 10/2000 | Geib et al. | 453/10 |
| 6,142,285 | A | 11/2000 | Panzeri et al. | 194/328 |
| 6,145,738 | A | 11/2000 | Stinson et al. | 235/379 |
| 6,154,879 | A | 11/2000 | Pare, Jr. et al. | 902/3 |
| 6,168,001 | B1 | 1/2001 | Davis | 194/200 |
| 6,171,182 | B1 | 1/2001 | Geib et al. | 453/10 |
| 6,174,230 | B1 | 1/2001 | Gerrity et al. | 453/57 |
| 6,196,371 | B1 | 3/2001 | Martin et al. | 194/317 |
| 6,196,913 | B1 | 3/2001 | Geib et al. | 453/10 |
| 6,230,928 | B1 | 5/2001 | Hanna et al. | 221/13 |
| 6,264,545 | B1 | 7/2001 | Magee et al. | 453/3 |
| 6,308,887 | B1 | 10/2001 | Korman et al. | 235/379 |
| 6,318,536 | B1 | 11/2001 | Korman et al. | 194/217 |
| 6,318,537 | B1 | 11/2001 | Jones et al. | 194/346 |
| 6,349,972 | B1 | 2/2002 | Geiger et al. | 283/67 |
| 6,412,620 | B1 | 7/2002 | Imura | 194/317 |
| 6,431,342 | B1 | 8/2002 | Schwartz | 194/346 |
| 6,438,230 | B1 | 8/2002 | Moore | 380/42 |
| 6,456,928 | B1 | 9/2002 | Johnson | 701/114 |
| 6,471,030 | B1 | 10/2002 | Neubarth et al. | 194/317 |
| 6,474,548 | B1 | 11/2002 | Montross et al. | 235/379 |
| 6,484,863 | B1 | 11/2002 | Molbak | 194/216 |
| 6,484,884 | B1 | 11/2002 | Gerrity et al. | 209/233 |
| 6,494,776 | B1 | 12/2002 | Molbak | 453/32 |
| 6,499,277 | B1 | 12/2002 | Warner et al. | 53/447 |
| 6,503,138 | B2 | 1/2003 | Spoehr et al. | 453/10 |
| 6,520,308 | B1 | 2/2003 | Martin et al. | 194/317 |
| 6,522,772 | B1 | 2/2003 | Morrison et al. | 382/124 |
| 6,547,131 | B1 | 4/2003 | Foodman et al. | 235/380 |
| 6,552,781 | B1 | 4/2003 | Rompel et al. | 256/71 |
| 6,554,185 | B1 | 4/2003 | Montross et al. | 235/379 |
| 6,579,165 | B2 | 6/2003 | Kuhlin et al. | 453/3 |
| 6,581,042 | B2 | 6/2003 | Pare, Jr. et al. | 705/40 |
| 6,602,125 | B2 | 8/2003 | Martin | 453/12 |
| 6,609,604 | B1 | 8/2003 | Jones et al. | 194/302 |
| 6,612,921 | B2 | 9/2003 | Geib et al. | 453/13 |
| 6,637,576 | B1 | 10/2003 | Jones et al. | 194/216 |
| 6,640,956 | B1 | 11/2003 | Zwieg et al. | 194/328 |
| 6,644,696 | B2 | 11/2003 | Brown et al. | 283/67 |
| 6,655,585 | B2 | 12/2003 | Shinn | 235/382 |
| 6,659,259 | B2 | 12/2003 | Knox et al. | 194/217 |
| 6,662,166 | B2 | 12/2003 | Pare, Jr. et al. | 705/39 |
| 6,663,675 | B2 | 12/2003 | Blake et al. | 753/63 |
| 6,666,318 | B2 | 12/2003 | Gerrity et al. | 194/347 |
| 6,755,730 | B2 | 6/2004 | Geib et al. | 453/3 |
| 6,758,316 | B2 | 7/2004 | Molbak | 194/200 |
| 6,761,308 | B1 | 7/2004 | Hanna et al. | 235/379 |
| 6,766,892 | B2 | 7/2004 | Martin et al. | 194/317 |
| 6,783,452 | B2 | 8/2004 | Hino et al. | 453/3 |
| 6,783,785 | B1 | 8/2004 | Raghavan et al. | 426/489 |
| 6,786,398 | B1 | 9/2004 | Stinson et al. | 235/379 |
| 6,854,581 | B2 | 2/2005 | Molbak | 194/344 |
| 6,854,640 | B2 | 2/2005 | Peklo | 235/100 |
| 6,863,168 | B1 | 3/2005 | Gerrity et al. | 194/347 |
| 6,892,871 | B2 | 5/2005 | Strauts et al. | 194/302 |
| 6,896,118 | B2 | 5/2005 | Jones et al. | 194/217 |

(56) References Cited

U.S. PATENT DOCUMENTS

| | | | | |
|---|---|---|---|---|
| 6,928,546 | B1 | 8/2005 | Nanavati et al. | 713/186 |
| 6,950,810 | B2 | 9/2005 | Lapsley et al. | 705/78 |
| 6,953,150 | B2 | 10/2005 | Shepley et al. | 235/379 |
| 6,957,746 | B2 | 10/2005 | Martin et al. | 221/131 |
| 6,966,417 | B2 | 11/2005 | Peklo et al. | 194/344 |
| 6,976,570 | B2 | 12/2005 | Molbak | 194/215 |
| 6,988,606 | B2 | 1/2006 | Geib et al. | 194/334 |
| 6,991,530 | B2 | 1/2006 | Hino et al. | 453/3 |
| 7,004,831 | B2 | 2/2006 | Hino et al. | 453/5 |
| 7,014,029 | B2 | 3/2006 | Winters | 194/302 |
| 7,014,108 | B2 | 3/2006 | Sorenson et al. | 235/381 |
| 7,017,729 | B2 | 3/2006 | Gerrity et al. | 194/347 |
| 7,018,286 | B2 | 3/2006 | Blake et al. | 453/61 |
| 7,028,827 | B1 | 4/2006 | Molbak et al. | 194/346 |
| 7,036,651 | B2 | 5/2006 | Tam et al. | 194/217 |
| 7,083,036 | B2 | 8/2006 | Adams | 194/223 |
| 7,113,929 | B1 | 9/2006 | Beach et al. | 705/65 |
| 7,131,580 | B2 | 11/2006 | Molbak | 235/379 |
| 7,149,336 | B2 | 12/2006 | Jones et al. | 382/135 |
| 7,152,727 | B2 | 12/2006 | Waechter | 194/317 |
| 7,158,662 | B2 | 1/2007 | Chiles | 382/135 |
| 7,188,720 | B2 | 3/2007 | Geib et al. | 194/302 |
| 7,213,697 | B2 | 5/2007 | Martin et al. | 194/317 |
| 7,243,773 | B2 | 7/2007 | Bochonok et al. | 194/350 |
| 7,269,279 | B2 | 9/2007 | Chiles | 382/135 |
| 7,303,119 | B2 | 12/2007 | Molbak | 235/379 |
| 7,331,521 | B2 | 2/2008 | Sorenson et al. | 235/381 |
| 7,337,890 | B2 | 3/2008 | Bochonok et al. | 194/353 |
| 7,427,230 | B2 | 9/2008 | Blake et al. | 453/63 |
| 7,438,172 | B2 | 10/2008 | Long et al. | 194/347 |
| 7,464,802 | B2 | 12/2008 | Gerrity et al. | 194/347 |
| 7,520,374 | B2 | 4/2009 | Martin et al. | 194/317 |
| 7,551,764 | B2 | 6/2009 | Chiles et al. | 382/135 |
| 7,552,810 | B2 | 6/2009 | Mecklenburg | 194/317 |
| 7,580,859 | B2 | 8/2009 | Economy | 705/16 |
| 7,654,450 | B2 | 2/2010 | Mateen et al. | 235/379 |
| 7,658,270 | B2 | 2/2010 | Bochonok et al. | 194/350 |
| 7,743,902 | B2 | 6/2010 | Wendell et al. | 194/302 |
| 7,778,456 | B2 | 8/2010 | Jones et al. | 382/135 |
| 7,819,308 | B2 | 10/2010 | Osterberg et al. | 235/379 |
| 7,874,478 | B2 | 1/2011 | Molbak | 235/379 |
| 7,886,980 | B2 | 2/2011 | Blake et al. | 194/347 |
| 7,931,304 | B2 | 4/2011 | Brown et al. | 283/57 |
| 7,946,406 | B2 | 5/2011 | Blake et al. | 194/200 |
| 7,963,382 | B2 | 6/2011 | Wendell et al. | 194/302 |
| 7,980,378 | B2 | 7/2011 | Jones et al. | 194/217 |
| 8,023,715 | B2 | 9/2011 | Jones et al. | 382/135 |
| 8,042,732 | B2 | 10/2011 | Blake et al. | 235/375 |
| 2001/0034203 | A1 | 10/2001 | Geib et al. | 453/3 |
| 2001/0048025 | A1 | 12/2001 | Shinn | 235/382 |
| 2002/0065033 | A1 | 5/2002 | Geib et al. | 453/3 |
| 2002/0069104 | A1 | 6/2002 | Beach et al. | 705/14 |
| 2002/0074209 | A1 | 6/2002 | Karlsson | 194/330 |
| 2002/0095587 | A1 | 7/2002 | Doyle et al. | 713/186 |
| 2002/0107738 | A1 | 8/2002 | Beach et al. | 705/14 |
| 2002/0126885 | A1 | 9/2002 | Mennie et al. | 382/135 |
| 2002/0130011 | A1 | 9/2002 | Casanova et al. | 194/344 |
| 2002/0147588 | A1 | 10/2002 | Davis et al. | 704/246 |
| 2002/0151267 | A1 | 10/2002 | Kuhlin et al. | 453/3 |
| 2002/0174348 | A1 | 11/2002 | Ting | 713/186 |
| 2002/0179401 | A1 | 12/2002 | Knox et al. | 194/217 |
| 2003/0004878 | A1 | 1/2003 | Akutsu et al. | 705/43 |
| 2003/0013403 | A1 | 1/2003 | Blake et al. | 453/60 |
| 2003/0081824 | A1 | 5/2003 | Mennie et al. | 382/135 |
| 2003/0127299 | A1 | 7/2003 | Jones et al. | 194/217 |
| 2003/0168309 | A1 | 9/2003 | Geib et al. | 194/302 |
| 2003/0168310 | A1 | 9/2003 | Strauts et al. | 194/302 |
| 2003/0182217 | A1 | 9/2003 | Chiles | 705/35 |
| 2003/0190882 | A1 | 10/2003 | Blake et al. | 453/63 |
| 2003/0234153 | A1 | 12/2003 | Blake et al. | 194/347 |
| 2004/0055902 | A1 | 3/2004 | Peklo | 206/0.815 |
| 2004/0092222 | A1 | 5/2004 | Kowalczyk et al. | 453/12 |
| 2004/0153406 | A1 | 8/2004 | Alarcon-Luther et al. | 705/41 |
| 2004/0153421 | A1 | 8/2004 | Robinson | 705/75 |
| 2004/0154899 | A1 | 8/2004 | Peklo et al. | 193/33 |
| 2004/0173432 | A1 | 9/2004 | Jones | 194/216 |
| 2004/0188221 | A1 | 9/2004 | Carter | 194/215 |
| 2004/0200691 | A1 | 10/2004 | Geib et al. | 194/302 |
| 2004/0256197 | A1 | 12/2004 | Blake et al. | 194/350 |
| 2005/0006197 | A1 | 1/2005 | Wendell et al. | 194/302 |
| 2005/0035140 | A1 | 2/2005 | Carter | 221/195 |
| 2005/0040007 | A1 | 2/2005 | Geib et al. | 194/302 |
| 2005/0040225 | A1 | 2/2005 | Csulits et al. | 235/379 |
| 2005/0045450 | A1 | 3/2005 | Geib et al. | 194/318 |
| 2005/0067305 | A1 | 3/2005 | Bochonok et al. | 206/8 |
| 2005/0077142 | A1 | 4/2005 | Tam et al. | 194/217 |
| 2005/0087425 | A1 | 4/2005 | Peklo | 194/350 |
| 2005/0108165 | A1 | 5/2005 | Jones et al. | 705/43 |
| 2005/0109836 | A1 | 5/2005 | Ben-Aissa | 235/380 |
| 2005/0124407 | A1 | 6/2005 | Rowe | 463/25 |
| 2005/0156318 | A1 | 7/2005 | Douglas | 257/761 |
| 2005/0205654 | A1 | 9/2005 | Carter | 235/7 R |
| 2005/0205655 | A1 | 9/2005 | Carter | 235/7 R |
| 2005/0228717 | A1 | 10/2005 | Gusler et al. | 705/14 |
| 2005/0256792 | A1 | 11/2005 | Shimizu et al. | 705/35 |
| 2006/0037835 | A1 | 2/2006 | Doran et al. | 194/302 |
| 2006/0054455 | A1 | 3/2006 | Kuykendall et al. | 194/217 |
| 2006/0054457 | A1 | 3/2006 | Long et al. | 194/347 |
| 2006/0060363 | A2 | 3/2006 | Carter | 172/111 |
| 2006/0064379 | A1 | 3/2006 | Doran et al. | 705/42 |
| 2006/0069654 | A1 | 3/2006 | Beach et al. | 705/65 |
| 2006/0148394 | A1 | 7/2006 | Blake et al. | 453/12 |
| 2006/0149415 | A1 | 7/2006 | Richards | 700/236 |
| 2006/0151285 | A1 | 7/2006 | String | 194/350 |
| 2006/0154589 | A1 | 7/2006 | String | 453/11 |
| 2006/0175176 | A1 | 8/2006 | Blake | 194/216 |
| 2006/0182330 | A1 | 8/2006 | Chiles | 382/135 |
| 2006/0196754 | A1 | 9/2006 | Bochonok et al. | 194/347 |
| 2006/0205481 | A1 | 9/2006 | Dominelli | 463/25 |
| 2006/0207856 | A1 | 9/2006 | Dean et al. | 194/302 |
| 2006/0219519 | A1 | 10/2006 | Molbak et al. | 194/346 |
| 2006/0283685 | A1 | 12/2006 | Cousin | 194/217 |
| 2007/0051582 | A1 | 3/2007 | Bochonok et al. | 194/202 |
| 2007/0071302 | A1 | 3/2007 | Jones et al. | 382/135 |
| 2007/0108015 | A1 | 5/2007 | Bochonok et al. | 194/350 |
| 2007/0119681 | A1 | 5/2007 | Blake et al. | 194/215 |
| 2007/0181676 | A1 | 8/2007 | Mateen et al. | 235/381 |
| 2007/0187494 | A1 | 8/2007 | Hanna | 235/383 |
| 2007/0221470 | A1 | 9/2007 | Mennie et al. | 194/216 |
| 2007/0269097 | A1 | 11/2007 | Chiles et al. | 382/135 |
| 2008/0033829 | A1 | 2/2008 | Mennie et al. | 705/16 |
| 2008/0044077 | A1 | 2/2008 | Mennie et al. | 382/135 |
| 2008/0220707 | A1 | 9/2008 | Jones et al. | 453/2 |
| 2009/0018959 | A1 | 1/2009 | Doran et al. | 705/44 |
| 2009/0236200 | A1 | 9/2009 | Hallowell et al. | 194/215 |
| 2009/0236201 | A1 | 9/2009 | Blake et al. | 194/215 |
| 2009/0239459 | A1 | 9/2009 | Watts et al. | 453/18 |
| 2009/0242626 | A1 | 10/2009 | Jones et al. | 235/379 |
| 2009/0320106 | A1 | 12/2009 | Jones et al. | 726/5 |
| 2010/0038419 | A1 | 2/2010 | Blake et al. | 235/379 |
| 2010/0198726 | A1 | 8/2010 | Doran et al. | 705/41 |
| 2010/0261421 | A1 | 10/2010 | Wendell et al. | 453/4 |
| 2010/0276485 | A1 | 11/2010 | Jones et al. | 235/379 |
| 2010/0327005 | A1 | 12/2010 | Martin et al. | 221/98 |
| 2011/0098845 | A1 | 4/2011 | Mennie et al. | 700/223 |
| 2011/0099105 | A1 | 4/2011 | Mennie et al. | 705/41 |
| 2011/0270695 | A1 | 11/2011 | Jones et al. | 705/43 |
| 2012/0067950 | A1 | 3/2012 | Blake | 235/381 |

FOREIGN PATENT DOCUMENTS

| | | | | |
|---|---|---|---|---|
| CA | 2143943 | C | 3/2003 | G07D 3/16 |
| DE | 06 60 354 | | 5/1938 | G07F 17/26 |
| DE | 30 21 327 | A1 | 12/1981 | G07D 3/06 |
| EP | 0 351 217 | A2 | 1/1990 | G07F 9/04 |
| EP | 0 667 973 | B1 | 1/1997 | G07D 3/14 |
| EP | 0 926 634 | A2 | 6/1999 | G07D 3/14 |
| EP | 1 104 920 | A1 | 6/2001 | G07D 5/08 |
| EP | 1 209 639 | A2 | 5/2002 | G07F 19/00 |
| EP | 1 528 513 | A1 | 5/2005 | G07F 7/08 |
| FR | 2042254 | | 2/1971 | G07B 11/00 |
| GB | 2035642 | A | 6/1980 | G07F 7/10 |
| GB | 2175427 | A | 11/1986 | G07F 17/42 |
| GB | 2198274 | A | 6/1988 | G07D 3/00 |

(56) References Cited

FOREIGN PATENT DOCUMENTS

| | | | | |
|---|---|---|---|---|
| GB | 2458387 | A | 9/2009 | G07D 11/00 |
| GB | 2468783 | A | 9/2010 | C07D 9/00 |
| JP | 49-058899 | | 6/1974 | |
| JP | 52-014495 | | 2/1977 | G07F 5/10 |
| JP | 52-071300 | A | 6/1977 | G07F 5/22 |
| JP | 56-040992 | A | 4/1981 | G07F 5/18 |
| JP | 57-117080 | A | 7/1982 | G07D 3/16 |
| JP | 59-079392 | A | 5/1984 | G07D 3/16 |
| JP | 60-016271 | U | 2/1985 | G07F 7/02 |
| JP | 62-134168 | U | 8/1987 | G07B 1/00 |
| JP | 62-182995 | A | 8/1987 | G07F 7/08 |
| JP | 62-221773 | A | 9/1987 | G06F 15/30 |
| JP | 62-166562 | U | 10/1987 | G07B 1/00 |
| JP | 64-035683 | A | 2/1989 | G07D 9/00 |
| JP | 64-042789 | A | 2/1989 | G07F 9/00 |
| JP | 64-067698 | A | 3/1989 | G07F 7/08 |
| JP | 01-118995 | A | 5/1989 | G07G 1/00 |
| JP | 01-307891 | A | 12/1989 | G07D 9/00 |
| JP | 02-050793 | A | 2/1990 | G07D 9/00 |
| JP | 02-252096 | A | 10/1990 | G07D 9/00 |
| JP | 03-012776 | A | 1/1991 | G06F 15/30 |
| JP | 03-063795 | A | 3/1991 | G07D 3/00 |
| JP | 03-092994 | A | 4/1991 | G07D 9/00 |
| JP | 03-156673 | A | 7/1991 | G06F 15/30 |
| JP | 04-085695 | A | 3/1992 | G07F 11/72 |
| JP | 04-175993 | A | 6/1992 | G07F 5/22 |
| JP | 05-046839 | A | 2/1993 | G07D 5/02 |
| JP | 05046839 | | 2/1993 | |
| JP | 05-217048 | A | 8/1993 | G07D 3/16 |
| JP | 05217048 | | 8/1993 | |
| JP | 05-274527 | A | 10/1993 | G07D 9/00 |
| JP | 06-035946 | A | 2/1994 | G06F 15/30 |
| JP | 06-103285 | A | 4/1994 | G06F 15/21 |
| JP | 09-251566 | A | 9/1997 | G07F 7/08 |
| JP | 2002-117439 | A | 4/2002 | G07D 9/00 |
| JP | 2003-242287 | A | 8/2003 | G06F 17/60 |
| JP | 2004-213188 | A | 7/2004 | G06F 17/60 |
| SE | 44 244 | | 9/1988 | |
| WO | WO 85/00909 | A1 | 2/1985 | G07D 5/02 |
| WO | WO 91/06927 | A1 | 5/1991 | G07D 3/16 |
| WO | WO 91/08952 | A1 | 6/1991 | B65B 11/04 |
| WO | WO 91/12594 | A1 | 8/1991 | G07D 3/16 |
| WO | WO 91/18371 | A1 | 11/1991 | G07D 3/16 |
| WO | WO 92/08212 | A1 | 5/1992 | G07D 3/16 |
| WO | WO 92/20043 | A1 | 11/1992 | G07D 3/00 |
| WO | WO 92/20044 | A1 | 11/1992 | G07D 3/16 |
| WO | WO 92/22044 | A1 | 12/1992 | G07D 3/00 |
| WO | WO 93/00660 | A1 | 1/1993 | G07D 3/00 |
| WO | WO 93/09621 | A1 | 5/1993 | H04L 9/32 |
| WO | WO 94/06101 | A1 | 3/1994 | G07D 3/16 |
| WO | WO 94/08319 | A1 | 4/1994 | G07D 3/16 |
| WO | WO 94/23397 | A1 | 10/1994 | G07D 3/00 |
| WO | WO 95/02226 | A1 | 1/1995 | G07D 3/00 |
| WO | WO 95/04978 | A1 | 2/1995 | G07D 3/06 |
| WO | WO 95/06920 | A1 | 3/1995 | G07D 3/16 |
| WO | WO 95/09406 | A1 | 4/1995 | G07D 3/16 |
| WO | WO 95/13596 | A1 | 5/1995 | G07D 3/14 |
| WO | WO 95/19017 | A1 | 7/1995 | G07D 1/00 |
| WO | WO 95/23387 | A1 | 8/1995 | G07D 3/16 |
| WO | WO 95/30215 | A1 | 11/1995 | G07F 17/42 |
| WO | WO 96/07163 | A1 | 3/1996 | G07D 3/06 |
| WO | WO 96/07990 | A1 | 3/1996 | G07D 3/16 |
| WO | WO 96/12253 | A1 | 4/1996 | G07D 3/00 |
| WO | WO 96/27525 | A1 | 9/1996 | B65B 11/02 |
| WO | WO 96/27859 | A1 | 9/1996 | G07D 5/08 |
| WO | WO 97/22919 | A1 | 6/1997 | G06F 7/08 |
| WO | WO 97/25692 | A1 | 7/1997 | G07D 3/06 |
| WO | WO 98/24041 | A1 | 6/1998 | G06F 17/60 |
| WO | WO 98/24067 | A1 | 6/1998 | G07D 3/14 |
| WO | WO 98/48383 | A2 | 10/1998 | G07D 1/00 |
| WO | WO 98/48384 | A2 | 10/1998 | G07D 1/00 |
| WO | WO 98/48385 | A2 | 10/1998 | G07D 1/00 |
| WO | WO 98/51082 | A1 | 11/1998 | H04N 7/18 |
| WO | WO 98/59323 | A1 | 12/1998 | G07D 3/00 |
| WO | WO 99/00776 | A1 | 1/1999 | G07F 9/06 |
| WO | WO 99/06937 | A1 | 2/1999 | G06F 19/00 |
| WO | WO 99/16027 | A2 | 4/1999 | G07F 7/02 |
| WO | WO 99/33030 | A1 | 7/1999 | G07D 3/00 |
| WO | WO 99/41695 | A1 | 8/1999 | G06K 5/00 |
| WO | WO 99/48057 | A1 | 9/1999 | G07D 3/06 |
| WO | WO 99/48058 | A1 | 9/1999 | G07D 3/06 |
| WO | WO 00/48911 | A1 | 8/2000 | B65B 67/12 |
| WO | WO 00/65546 | A1 | 11/2000 | G07F 1/04 |
| WO | WO 01/63565 | A2 | 8/2001 | G07D 9/00 |
| WO | WO 02/071343 | A1 | 9/2002 | G07D 3/00 |
| WO | WO 03/052700 | A2 | 6/2003 | |
| WO | WO 03/079300 | A1 | 9/2003 | G07D 7/00 |
| WO | WO 03/085610 | A1 | 10/2003 | G07D 9/06 |
| WO | WO 03/107280 | A2 | 12/2003 | |
| WO | WO 2004/044853 | A1 | 5/2004 | G07D 3/12 |
| WO | WO 2004/109464 | A2 | 12/2004 | |
| WO | WO 2005/041134 | A2 | 5/2005 | |
| WO | WO 2005/088563 | A1 | 9/2005 | G07D 3/00 |
| WO | WO 2006/086531 | A1 | 8/2006 | G07D 9/00 |
| WO | WO 2007/035420 | A2 | 3/2007 | G06F 7/00 |
| WO | WO 2007/120825 | A2 | 10/2007 | G06K 9/00 |

OTHER PUBLICATIONS

AUI: Coinverter—"No More Lines . . . Self-Serve Cash-Out," by Cassius Elston, 1995 World Games Congress/Exposition Converter, 1 page (dated prior to 1995).

Brandt: 95 Series Coin Sorter Counter, 2 pages (1982).

Brandt: Model 817 Automated Coin and Currency Ordering System, 2 pages (1983).

Brandt: Model 920/925 Counter, 2 pages (date unknown, prior to Jul. 2011, possibly prior to Mar. 17, 1997).

Brandt: System 930 Electric Counter/Sorter, "Solving Problems, Pleasing Customer, Building Deposits," 1 page (date unknown, prior to Mar. 2, 2011, possibly prior to Mar. 17, 1997).

Brandt: Model 940-6 High Speed Sorter/Counter, 2 pages (date unknown, prior to Oct. 31, 1989).

Brandt: System 945 High-Speed Sorter, 2 pages (date unknown, prior to Mar. 2, 2011, possibly prior to Mar. 17, 1997).

Brandt: Model 952 Coin Sorter/Counter, 2 pages (date unknown, prior to Oct. 31, 1989).

Brandt: Model 954 Coin Sorter/Counter, 2 pages (date unknown, prior to Oct. 31, 1989).

Brandt: Model 957 Coin Sorter/Counter, 2 pages (date unknown, prior to Oct. 31, 1989).

Brandt: Model 958 Coin Sorter/Counter, 5 pages (© 1982).

Brandt: Model 960 High-Speed Coin Sorter & Counter, 2 pages (1984).

Brandt; Model 966 Microsort™ Coin Sorter and Counter, 4 pages, (1979).

Brandt: Model 970 Coin Sorter and Counter, 2 pages (1983).

Brandt: Model 1205 Coin Sorter Counter, 2 pages (1986).

Brandt: Model 1400 Coin Sorter Counter, 2 pages (date unknown, prior to Mar. 2, 2011, possibly prior to Mar. 17, 1997).

Brandt: Model 8904 Upfeed—"High Speed 4-Denomination Currency Dispenser," 2 pages (1989).

Brandt: Mach 7 High-Speed Coin Sorter/Counter, 2 pages (1992).

Case ICC Limited: CDS Automated Receipt Giving Cash Deposit System, 3 pages (date unknown, prior to Nov. 15, 2000).

Cash, Martin: Newspaper Article "Bank Blends New Technology With Service," Winnipeg Free Press, 1 page (Sep. 4, 1992).

Childers Corporation: Computerized Sorter/Counter, "To coin an old adage, time is money . . . ,"3 pages (1981).

CTcoin: CDS602 Cash Deposit System, 1 page (date unknown, prior to Jan. 15, 2001).

Cummins: Cash Information and Settlement Systems (Form 023-1408), 4 pages (date Dec. 1991).

Cummins: The Universal Solution to All Coin and Currency Processing Needs (Form 13C1218 3-83), 1 page (Mar. 1983).

Cummins: JetSort® High Speed Sorter/Counter Kits I & J—Operating Instructions (Form 022-7123-00) 12 pages (1994).

Cummins: JetSort® Coin Sorter Counter/CA-130XL Coin Wrapper, Cummins Automated Money Systems (AMS) Case Study—Fifth-

(56) References Cited

OTHER PUBLICATIONS

Third, "6,000 Coin Per Minute Counter/Sorter Keeps pace With Fifth-Third Bank's Money Processing Needs," (Form 13C1180), 2 pages (Nov. 1981).
Cummins: JetSort®, "Venders Love JetSort," (13C1255), 1 page (Mar. 1987).
Cummins: JetSort® "High Speed Coin Sorter & Counter for Payphone Applications," "CTOCS Ready" (Form 023-1365), 2 pages (Mar. 1989).
Cummins: JetSort® mailer, "One moving part simplicity," "Vendors—Are validators changing your coin and currency needs?" (Form 023-1297), 3 pages (Apr. 1987).
Cummins: JetSort® Series V High Speed Coin Sorter/Counter, (Form 023-1383), 2 pages (Sep. 1990).
Cummins: JetSort® "Time for a Change, Be a smashing success!," (Form 023-1328), 1 page (Jun. 1988).
Cummins: JetSort® "Time for a Change—JetSort® vs. Brandt X," (Form 023-1330), 1 page (Jun. 1988).
Cummins: JetSort® "Time for a Change—No Coins Sorted After 3:00 or on Saturday," (Form 023-1327), 1 page (Aug. 1988).
Cummins: JetSort®, "What do all these Banks have in Common . . . ?", JetSort, CA-130XL coin wrapper, CA-118 coin wrapper, CA-4000 JetCount, (13C1203), 3 pages (Aug. 1982).
Cummins: JetSort® 700-01/CA-118 Coin Wrapper, Cummins Automated Money Systems (AMS) Case Study—University State Bank, "Cummins Money Processing System Boosts Teller Service at University State Bank," (Form 13C1192), 2 pages (Mar. 1982).
Cummins: JetSort® 700-01, Cummins Automated Money Systems (AMS) Case Study—First State Bank of Oregon, "JetSort® Gives Bank Coin Service Edge," (Form 13C1196), 2 pages (Apr. 1982).
Cummins: JetSort® 700-01 Coin Sorter/Counter, Operating Instructions, 14 pages (1982).
Cummins: JetSort® 701, Cummins Automated Money Systems (AMS) Case Study—Convenco Vending, "High Speed Coin Sorter increases coin processing power at Convenco Vending," (Form 13C1226), 2 pages (Jul. 1983).
Cummins: JetSort Models 701 and 750 , "State-of-the-art coin processing comes of age," 2 pages (Feb. 1984).
Cummins: JetSort® Model CA-750 Coin Processor (Item No. 50-152), 1 page (Jul. 1984).
Cummins: JetSort® Model CA-750 Coin Sorter/Counter and CA-4050 JetCount currency counter, "Money Processing Made Easy," (Form 13C1221) 2 pages (Jun. 1983).
Cummins: JetSort® Model 1701 with JetStops, Operating Instructions Manual (Form 022-1329-00), 16 pages (1984).
Cummins: JetSort® Model 1760 brochure, (Form 023-1262-00), 2 pages (Jul. 1985).
Cummins: JetSort® Models 1770 and 3000, Communication Package specification and operating instructions, 10 pages (uncertain, possibly Nov. 1985).
Cummins: JetSort® Model 1770, "JetSort® Speed and Accuracy, Now with Communications!", (Form 023-1272) 1 page (Oct. 1986).
Cummins: JetSort® 2000 Series High Speed Coin Sorter/Counter (Form 023-1488), 2 pages (Oct. 2000).
Cummins: JetSort®3000 Series High Speed Coin Sorter (Form 023-1468 Rev 1), 2 pages (Feb. 1995).
Cummins: JetSort®3000 Series Options, "Talking JetSort 3000," (Form 023-1338-00), 1 page (between Jan. 1989-Feb. 1989).
Cummins: JetSort®3000, "3,000 Coins per Minute!," (Form 023-1312), 1 page (date unknown, est. 1987).
Cummins: JetSort®3200, Enhanced electronics for the JetSort® 3200 (Form 023-1350), 1 page (Apr. 1987).
De La Rue: CDS 500 Cash Deponier System, 6 pages (date unknown, p. 5 has date May 1994, p. 6 has date Dec. 1992) (German).
De La Rue: CDS 5700 and CDS 5800 Cash Deponier System (German) and translation, 7 pages (date unknown, prior to Aug. 13, 1996).
Diebold: Merchant MicroBranch, "Merchant MicroBranch Combines ATM After-Hour Depository Rolled-Coin Dispenser," Bank Technology News, 1 page (Nov. 1997).
Fa. GBS-Geldbearbeitungssysteme: GBS9401SB Technical Specification, 24 pages (date unknown, prior to Nov. 10, 2010).
Frisco Bay: Commercial Kiosk, "Provide self-service solutions for your business customers," 4 pages (date unknown, prior to Mar. 2, 2011, p. 4 has date 1996).
Glory: AMT Automated Merchant Teller, 4 pages (date unknown, prior to Jan. 15, 2001).
Glory: CRS-8000 Cash Redemption System, 2 pages (1996).
Hamilton: Hamilton's Express Banking Center, In Less Space Than A Branch Manager's Desk, 4 pages (date unknown, prior to Jan. 15, 2001).
ISH Electronic: ISH 12005/500 Coin Counter (with translation), 4 pages (date unknown, prior to Aug. 1996).
ISH Electronic: ISH 12005/501 Self-Service Unit (with translation), 4 pages (date unknown, prior to Aug. 1996).
Namsys, Inc.: Namsys Express, Making currency management . . . more profitable, 2 pages (date unknown, prior to Jan. 15, 2001).
NGZ Geldzahlmaschinengesellschaft: NGZ 2100 Automated Coin Depository, 4 pages (date unknown, prior to Sep. 1996).
Perconta: Contomat Coin Settlement Machine for Customer Self Service, 2 pages (date unknown, prior to Apr. 2003).
Prema GmbH: Prema 405 (RE) Self Service Coin Deposit Facility, 2 pages (date unknown, prior to Apr. 2003).
Reis Eurosystems: CRS 6501/CRS 6510 Cash Receipt Systems for Self-Service Area, 3 pages (date unknown, prior to Apr. 2003).
Reis Eurosystems: CRS 6520/ CRS 6525 Standard-Class Coin Deposit Systems, 1 page (date unknown, prior to Apr. 2003).
Reis Eurosystems: CS 3510 Disc-Sorter, 1 page (date unknown, prior to Apr. 2003).
Royal Bank: Hemeon, Jade, "Royal's Burlington drive-in bank provides customers 24-hour tellers," The Toronto Star, 1 page (Aug. 21, 1991).
Royal Bank: Leitch, Carolyn, "High-Tech Bank Counts Coins," The Globe and Mail, 2 pages (Sep. 19, 1991).
Royal Bank: Oxby, Murray, "Royal Bank Opens 'Super Branch,'" The Gazette Montreal, 2 pages (Sep. 14, 1991).
Royal Bank: SuperBranch, "Experience the Ultimate in Convenience Banking," 2 pages (Feb. 1992).
Scan Coin: International Report, 49 pages (Apr. 1987).
Scan Coin: Money Processing Systems, 8 pages (date unknown, prior to Apr. 2003).
Scan Coin: World, 2 pages (Feb. 1988).
Scan Coin: CDS Cash Deposit System, 6 pages (date unknown, prior to Apr. 2003) [SC 0369].
Scan Coin: CDS Coin Deposit System—Technical Referens Manual, 47 pages (1989).
Scan Coin: CDS 600 User's Manual, 14 pages (date unknown, prior to Apr. 2003).
Scan Coin: CDS 600 & CDS 640 Cash Deposit System—Technical Manual, 45 pages (date unknown, prior to Apr. 2003).
Scan Coin: CDS MK 1 Coin Deposit System—Technical Manual, 32 pages (1991).
Scan Coin: SC 102 Value Counter Technical Manual, 28 pages (date unknown, prior to Apr. 2003).
Pay by Touch: Secure ID News, "Piggly Wiggly Extends Biometric Payments Throughout The Southeast U.S.," 2 pages, (Dec. 14, 2005).
ESD, Inc: Smartrac Card System, "Coinless laundry makes quarters obsolete; Smartrac Card System really makes a change in laundry industry," Business Wire, 2 pages (Feb. 23, 1996).
Meece, Mickey: Article "Development Bank of Singapore Gets Cobranding Edge with Smart Cards," American Banker, New York, NY, vol. 159, Iss. 195, p. 37, 2 pages (Oct. 10, 1994).
PCT International Search Report for International Application No. PCT/US2005/007874 dated Aug. 4, 2005 (4 pages).

OPTICAL COIN DISCRIMINATION SENSOR AND COIN PROCESSING SYSTEM USING THE SAME

Matter enclosed in heavy brackets [ ] appears in the original patent but forms no part of this reissue specification; matter printed in italics indicates the additions made by reissue.

CROSS-REFERENCE TO RELATED APPLICATIONS

The present application is a continuation-in-part of U.S. patent application Ser. Nos. 10/095,164 and 10/095,256, each of which is incorporated herein by reference in its entirety. U.S. patent application Ser. No. 10/095,164 is entitled "Disc-Type Coin Processing Device Having Improved Coin Discrimination System" and was filed on Mar. 11, 2002 *now U.S. Pat. No. 6,755,730*. U.S. Pat. No. 10/095,256 is entitled "Sensor and Method For Discriminating Coins of Varied Composition, Thickness and Diameter" and was filed on Mar. 11, 2002 *now U.S. Pat. No. 6,892,871*.

FIELD OF THE INVENTION

The present invention relates generally to coin sensors and coin processing systems and, more particularly, to an optical coin sensor that discriminates between coins that discriminates among coins of different denominations.

BACKGROUND OF THE INVENTION

Generally, disc-type coin sorters sort coins according to the diameter of each coin. Typically, in a given coin set such as the United States coin set, each coin denomination has a different diameter. Thus, sorting coins by diameter effectively sorts the coins according to denomination.

Disc-type coin sorters typically include a resilient pad (disposed on a rotating disc) that rotates beneath a stationary sorting head having a lower surface positioned parallel to the upper surface of the resilient pad and spaced slightly therefrom. The rotating, resilient pad presses coins upward against the sorting head as the pad rotates. The lower surface of sorting head includes a plurality shaped regions including exit channels for manipulating and controlling the movement of the coins. Each of the exit channels is dimensioned to accommodate coins of a different diameter for sorting the coins based on diameter size. As coins are discharged from the sorting head via the exit channels, the sorted coins follow respective coin paths to sorted coin receptacles where the sorted coins are stored.

It is desirable in the sorting of coins to discriminate between valid coins and invalid coins. Use of the term "valid coin" refers to coins of the type to be sorted. Use of the term "invalid coin" refers to items being circulated on the rotating disc that are not one of the coins to be sorted. For example, it is common that foreign or counterfeit coins (e.g., slugs) enter the coin sorting system. So that such items are not sorted and counted as valid coins, it is helpful to detect and discard these "invalid coins" from the coin processing system. In another application wherein it is desired to process (e.g., count and/or sort) only U.S. quarters, nickels and dimes, all other U.S. coins including dollar-coins, half-dollar coins and pennies are considered "invalid." Additionally, coins from all other coins sets including Canadian coins and Euro coins, for example, would be considered "invalid" when processing U.S. coins.

Finally, any truly counterfeit coins (i.e., a slug) are always considered "invalid" in any application. In another application it may be desirable to separate Canadian coins from U.S. coins for example. Therefore, in that application all authentic U.S. coins are considered invalid, and all non-authentic U.S. coin, Canadian coins, and all coins from other coin sets (e.g., Euro coins) are considered invalid.

Typically, prior-art disc-type coin sorters include a discrimination sensor disposed within each exit channel for discriminating between valid and invalid coins as coins enter the exit channels. In such systems, therefore, coins entered the exit channel and are then discriminated. An invalid coin having a diameter that enables it to pass into an exit channel moves past the discrimination sensor. The discrimination sensor detects the invalid coin and a braking mechanism is triggered to stop the rotating disc before the invalid coin is moved out of the exit channel. A diverter, disposed within the coin path external, or internal, to the sorting head, moves such that a coin entering the coin path is diverted to an invalid coin receptacle. The sorting head is then jogged (electronically pulsed) causing the disc to incrementally rotate until the invalid coin is discharged from the exit channel to the coin path where it is diverted to a invalid coin receptacle. The diverter is moved back to its home position such that coins now entering the coin path are directed to the coin receptacles for valid coins. The coin sorter is then restarted and the disc begins to rotate at the normal sorting rate of speed.

One drawback associated with this type of prior art discrimination technique is the downtime consumed by the aforementioned stopping, jogging and restarting of the rotatable disc to remove the invalid coin. This process often takes approximately five seconds per invalid coin. Initially, this may appear to be a relatively insignificant amount of time; however, this time can add up to a significant amount of time in the processing of bulk coins.

Furthermore, because the rotatable disc rapidity breaks and stops so that an invalid coin is not ejected from a coin exit channel before the diverter is moved to route invalid coins to a reject receptacle, the overall speed (i.e., the number of rotations of the rotatable disc per minute) is limited. Additionally, this type prior art discrimination technique results in more "wear and tear" on the breaking system and motor.

Accordingly, a need exists for a coin processing machine that can discriminate invalid coins at a high-rate of speed.

SUMMARY OF THE INVENTION

According to one embodiment of the present invention, a method for determining the denomination of a coin with a disk-type coin processing system comprises moving a coin along a coin path with a rotatable disk, generating an encoder pulse for each incremental movement of the rotatable disk, directing a light beam transverse the coin path, detecting the light beam with a light detector, developing a signal at the light detector indicating the presence of a coin in the coin path, counting a number of encoder pulses occurring while developing the signal at the light detector, and comparing the counted number of encoder pulses to a plurality of stored numbers of encoder pulses corresponding to the particular coin denominations.

The above summary of the present invention is not intended to represent each embodiment, or every aspect, of the present invention. Additional features and benefits of the present invention will become apparent from the detailed description, figures, and claims set forth below.

BRIEF DESCRIPTION OF THE DRAWINGS

FIG. 4b is a cross-sectional view of an alternative embodiment of that which is shown in FIG. 4a.

Figure 1:
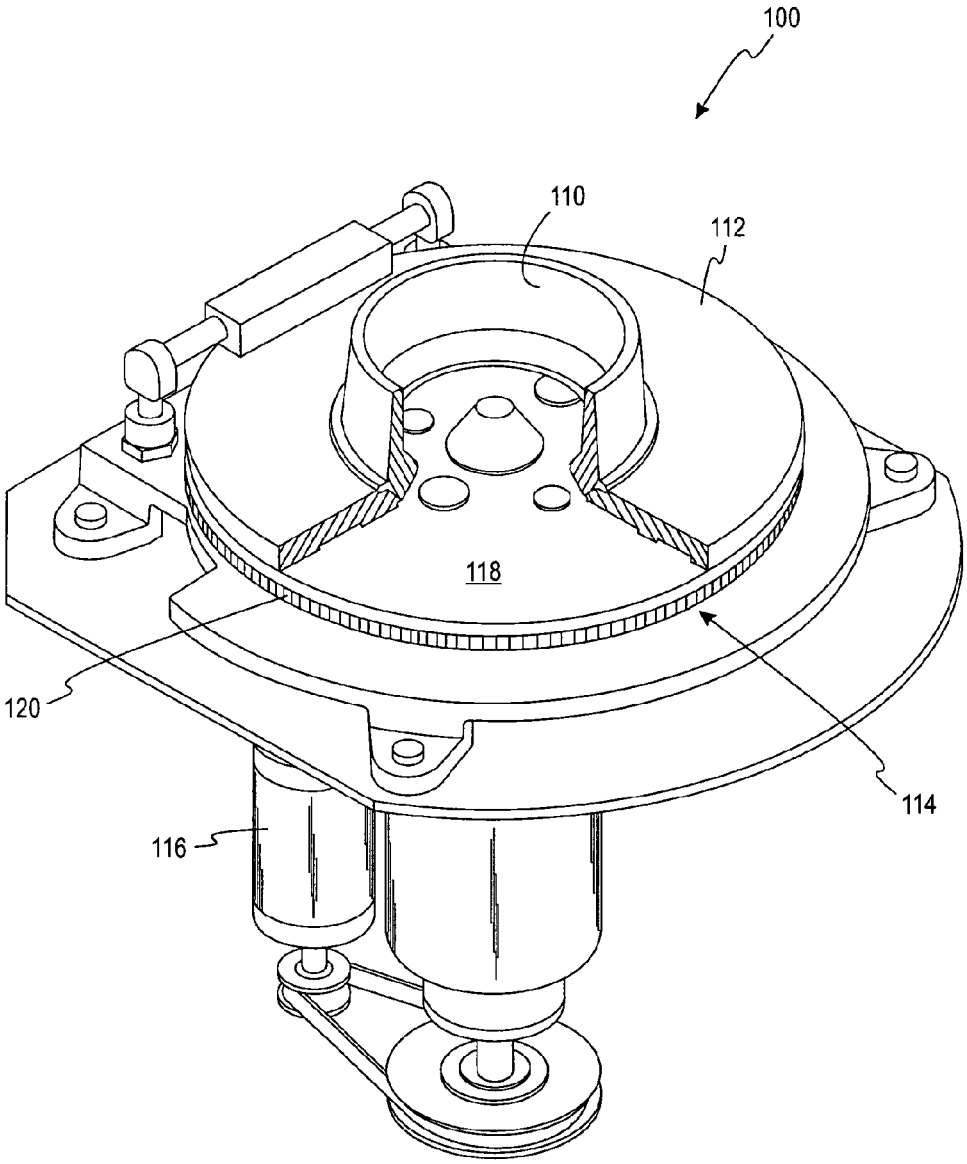
FIG. 1 is a perspective view of a coin processing system, according to one embodiment of the present invention, with portions thereof broken away to show the internal structure.

While the invention is susceptible to various modifications and alternative forms, specific embodiments will be shown byway of example in the drawings and will be desired in detail herein. It should be understood, however, that the invention is not intended to be limited to the particular forms disclosed. Rather, the invention is to cover all modifications, equivalents and alternatives falling within the spirit and scope of the invention as defined by the appended claims.

DETAILED DESCRIPTION OF THE ILLUSTRATED EMBODIMENTS

Turning now to the drawings and referring first to FIG. 1, a disc-type coin processing system 100 according to one embodiment of the present invention is shown. The coin processing system 100 includes a hopper 110 for receiving coins of mixed denominations that feeds the coins through a central opening in an annular sorting head 112. As the coins pass through this opening, they are deposited on the top surface of a rotatable disc 114. This rotatable disc 114 is mounted for rotation on a shaft (not shown) and driven by an electric motor 116. The disc 114 typically comprises a resilient pad 118, preferably made of a resilient rubber or polymeric material, bonded to the top surface of a solid disc 120. While the solid disc 120 is often made of metal, it can also be made of a rigid polymeric material.

According to one embodiment, coins are initially deposited by a user in a coin tray (not shown) disposed above the coin processing system 100 shown in FIG. 1. The user lifts the coin tray which funnels the coins into the hopper 110. A coin tray suitable for use in connection with the coin processing system 100 is described in detail in U.S. Pat. No. 4,964,495 entitled "Pivoting Tray For Coin Sorter," which is incorporated herein by reference in its entirety.

As the disc 114 is rotated, the coins deposited on the resilient pad 118 tend to slide outwardly over the surface of the pad 118 due to centrifugal force. As the coins move outwardly, those coins which are lying flat on the pad 118 enter the gap between the surface of the pad 118 and the sorting head 112 because the underside of the inner periphery of the sorting head 112 is spaced above the pad 118 by a distance which is about the same as the thickness of the thickest coin. As is further described below, the coins are processed and sent to exit stations where they are discharged. The coin exit stations may sort the coins into their respective denominations and discharge the coins from exit channels in the sorting head 112 corresponding to their denominations.

Figure 2:
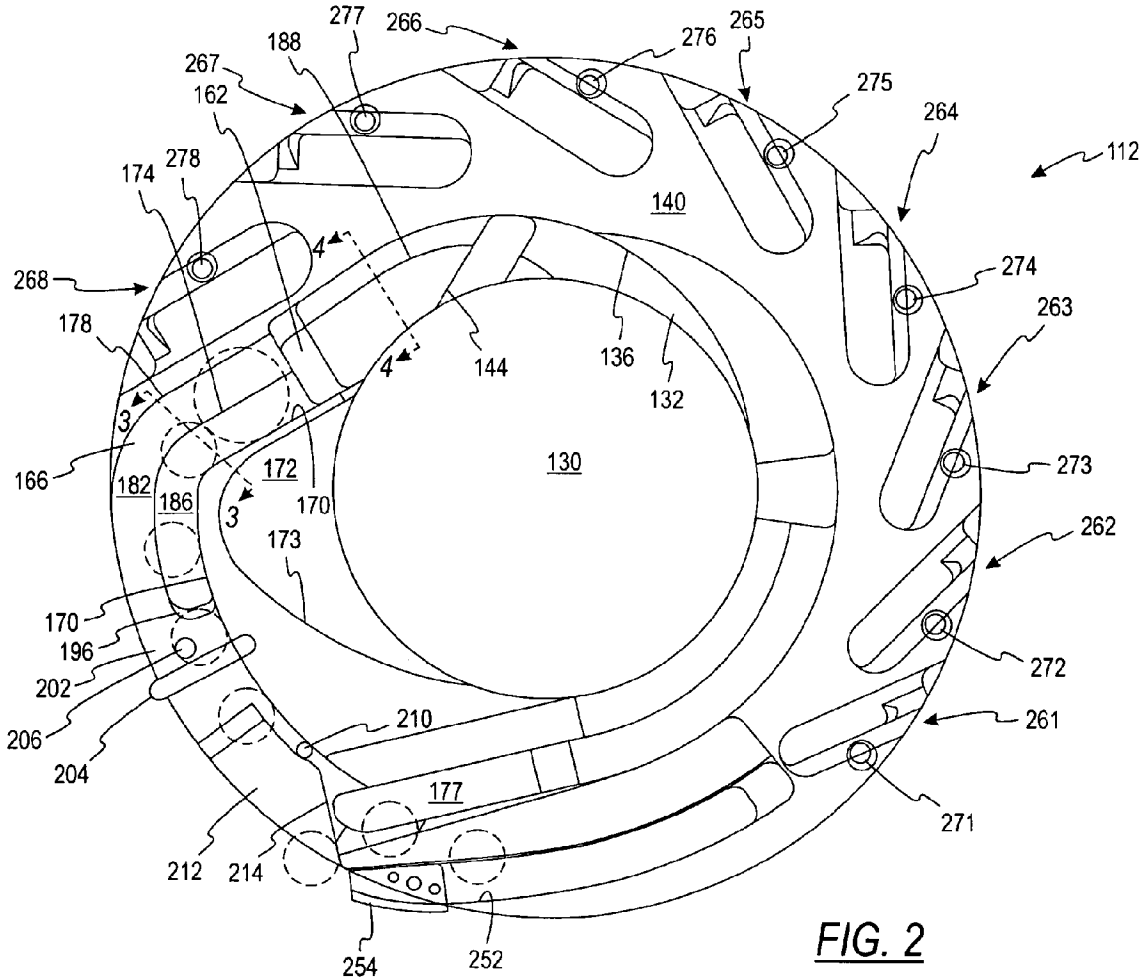
FIG. 2 is a bottom view of a sorting head for use with the system of FIG. 1.

Referring now to FIG. 2, the underside of the sorting head 112 is shown. The coin sets for any given country are sorted by the sorting head 112 due to variations in the diameter size. The coins circulate between the sorting head 112 and the pad 118 (FIG. 1) on the rotatable disc 114 (FIG. 1). The coins are deposited on the pad 118 via a central opening 130 and initially enter the entry channel 132 formed in the underside of the sorting head 112. It should be keep in mind that the circulation of the coins in FIG. 2 appears counterclockwise as FIG. 2 is a view of the underside of the sorting head 112.

An outer wall 136 of the entry channel 132 divides the entry channel 132 from the lowermost surface 140 of the sorting head 112. The lowermost surface 140 is preferably spaced from the pad 118 by a distance that is slightly less than the thickness of the thinnest coins. Consequently, the initial outward radial movement of all the coins is terminated when the coins engage the outer wall 136, although the coins continue to move more circumferentially along the wall 136 (in the counterclockwise directed as viewed in FIG. 2) by the rotational movement imparted to the coins by the pad 118 of the rotatable disc 114.

In some cases, coins may be stacked on top of each other—commonly referred to as "stacked" coins or "shingled" coins. Some of these coins, particularly thicker coins, will be under pad pressure and cannot move radially outward toward wall 136 under the centrifugal force. Stacked coins which are not against the wall 136 must be recirculated and stacked coins in contact against the wall 136 must be unstacked. To unstack the coins, the stacked coins encounter a stripping notch 144 whereby the upper coin of the stacked coins engages the stripping notch 144 and is channeled along the stripping notch 144 back to an area of the pad 118 disposed below the central opening 130 where the coins are then recirculated. The vertical dimension of the stripping notch 144 is slightly less the thickness of the thinnest coins so that only the upper coin is contacted and stripped. While the stripping notch 144 prohibits the further circumferential movement of the upper coin, the lower coin continues moving circumferentially across stripping notch 144 into the queuing channel 166.

Stacked coins that may have bypassed the stripping notch 144 by entering the entry channel 132 downstream of the stripping notch 144 are unstacked after the coins enter the queuing channel 166 and are turned into an inner queuing wall 170 of the queuing channel 166. The upper coin contacts the inner queuing wall 170 and is channeled along the inner queuing wall 170 while the lower coin is moved by the pad 118 across the inner queuing wall 170 into the region defined by surface 172 wherein the lower coin engages a wall 173 and is recirculated. Other coins that are not properly aligned along the inner queuing wall 170, but that are not recirculated by wall 173, are recirculated by recirculating channel 177.

As the pad 118 continues to rotate, those coins that were initially aligned along the wall 136 (and the lower coins of stacked coins moving beneath the stripping notch 144) move across the ramp 162 leading to the queuing channel 166 for aligning the innermost edge of each coin along the inner queuing wall 170. In addition to the inner queuing wall 170, the queuing channel 166 includes a first rail 174 and a second rail 178 that form the outer edges of stepped surfaces 182 and 186, respectively. The stepped surfaces 182, 186 are acutely angled with respect to the horizontal. The surfaces 182 and 186 are sized such that the width of surface 182 is less than that of the smallest (in terms of the diameter) coins and the width of surface 184 is less than that of the largest coin.

Figure 3:
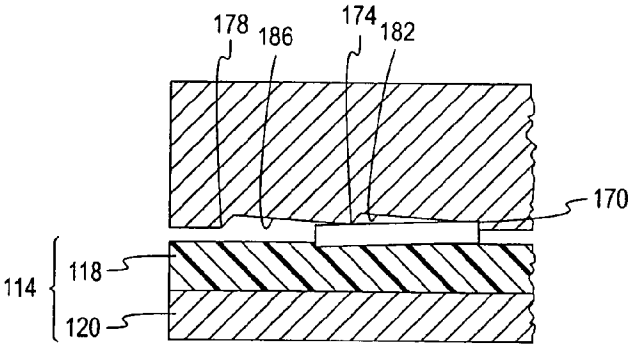
FIG. 3 is a cross-sectional view of the sorting head shown in FIG. 2 taken along line 3-3.

Referring for a moment to FIG. 3, a small diameter coin (e.g., a dime or a 1¢ Euro coin) is shown pressed into pad 118 by the first rail 174 of the sorting head 112. The rails 174, 178 are dimensioned to be spaced away from the top of the pad 118 by a distance less than the thickness of the thinnest coin so that the coins are gripped between the rail 174, 178 and the pad 118 as the coins move through the queuing channel 166. The coins are actually slightly tilted with respect to the sorting head 112 such that their outermost edges are digging into the pad 118. Consequently, due to this positive pressure on the outermost edges, the innermost edges of the coins tend to rise slightly away from the pad 118.

Referring back to FIG. 2, the coins are gripped between one of the two rails 174, 178 and the pad 118 as the coins are rotated through the queuing channel 166. The coins, which were initially aligned with the outer wall 136 of the entry channel 130 as the coins moved across the ramp 162 and into the queuing channel 166, are rotated into engagement with inner queuing wall 170. Because the queuing channel 166 applies a greater amount of pressure on the outside edges of the coins, the coin are less likely to bounce off the inner queuing wall 170 as the radial position of the coin is increased along the inner queuing wall 170.

Figure 4B:
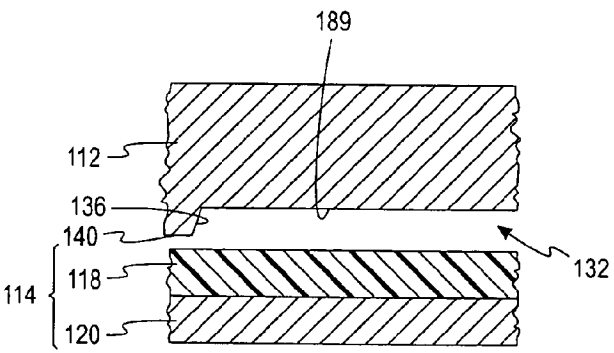
Figure 4A:
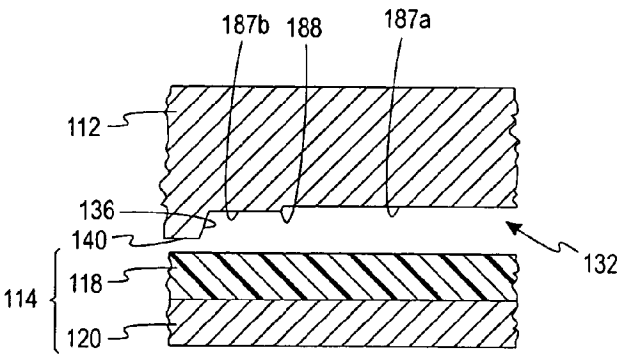
FIG. 4a is a cross-sectional view of the sorting head shown in FIG. 2 taken along 4-4.

Referring to FIG. 4a, the entry region 132 of the embodiment of the sorting head 112 shown in FIG. 2 includes two stepped surfaces 187a, 187b forming a rail 188 therebetween. According to an alternative embodiment of the sorting head 112, the entry channel 132 consists of one surface 189 as shown in FIG. 4b.

Figure 5:
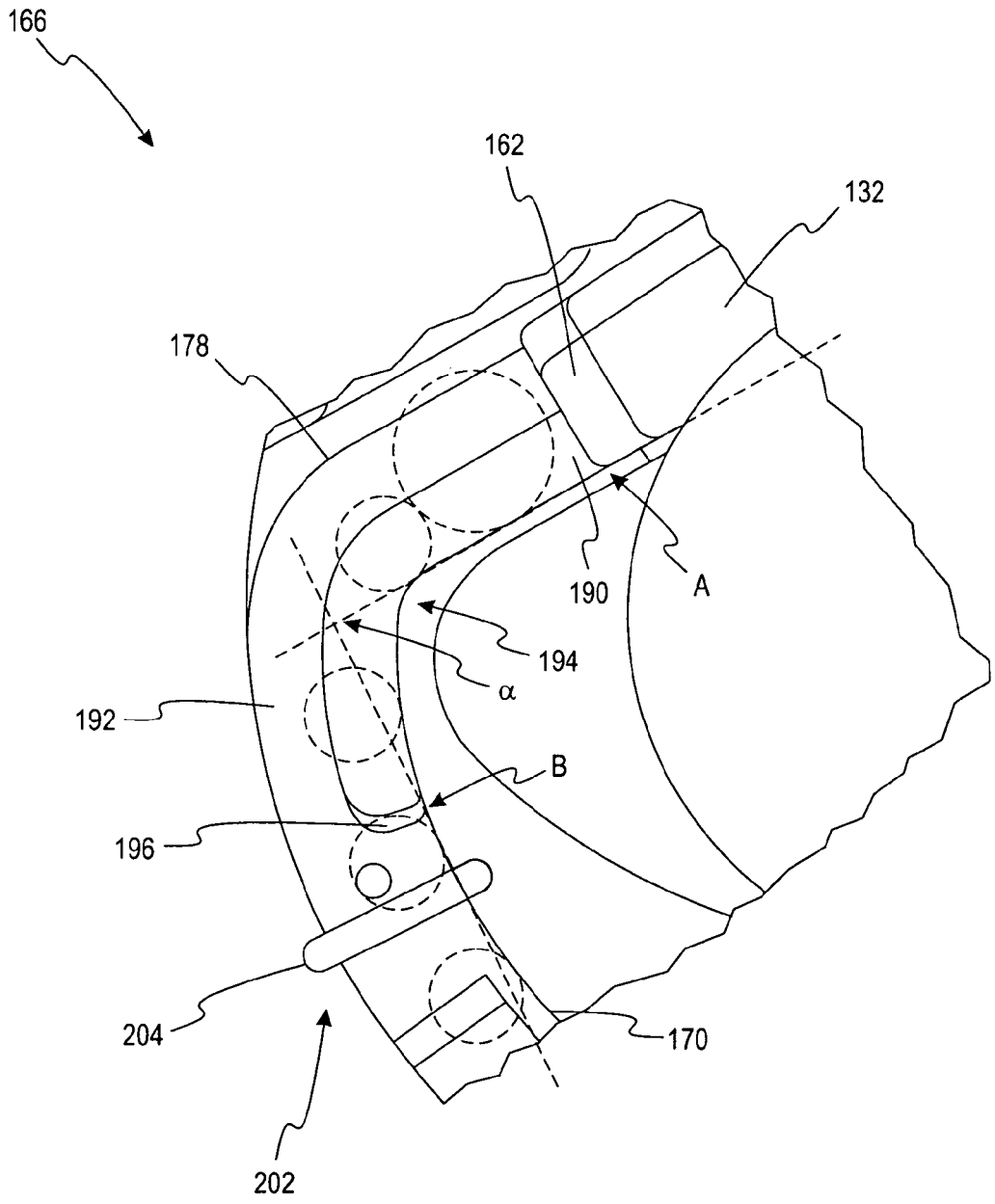
FIG. 5 is an oversize view of a queuing channel of the sorting head shown in FIG. 2.

Referring now to FIG. 5, there is shown an oversized view of the queuing channel 166 of FIG. 2. It can be seen that the queuing channel 166 is generally "L-shaped." The L-shaped queuing channel 166 is considered in two segments—a first upstream segment 190 and a second downstream segment 192. The upstream segment 190 receives the coins as the coins move across the ramp 162 and into the queuing channel 166. The coins enter the downstream segment 192 as the coins turn a corner 194 of the L-shaped queuing channel 166. As the pad 118 continues to rotate, the coins move along the second segment 192 and are still engaged on the inner queuing wall 170. The coins move across a ramp 196 as the coins enter a discrimination region 202 and a reject region having a reject channel 212 for off-sorting invalid coins, which are both located towards the downstream end of the second segment 192. The discrimination region includes a discrimination sensor 204 for discriminating between valid and invalid coins and/or identifying the denomination of coins.

The queuing channel 166 is designed such that a line tangent to the inner queuing wall 170 of the L-shaped queuing channel 166 at about the point where coins move past the ramp 196 into the discrimination region 202 (shown as point A in FIG. 5) forms an angle alpha ($\alpha$) with a line tangent to the inner queuing wall 170 at about the point where coins move over ramp 162 into the queuing channel 166 (shown as point B in FIG. 5). According to one embodiment of the present invention, the angle alpha ($\alpha$) is about 100°. According to alternative embodiments of the coin processing system 100, the angle alpha ($\alpha$) ranges between about 90° and about 110°.

As the pad 118 continues to rotates, the L-shape of the queuing channel 166 imparts spacing to the coins which are initially closely spaced, and perhaps abutting one another, as the coins move across the ramp 162 into the queuing channel 166. As the coins move along the first upstream segment 190 of the queuing channel 166, the coins are pushed against inner queuing wall 170 and travel along the inner queuing wall 170 in a direction that is transverse to (i.e., generally unparallel) the direction in which the pad 118 is rotating. This action aligns the coins against the inner queuing wall 170. However, as the coins round the corner 194 into the second downstream segment 192 of the queuing channel 166, the coins are turned in a direction wherein they are moving with the pad (i.e., in a direction more parallel to the direction of movement of the pad). A coin rounding the corner 194 is accelerated as the coin moves in a direction with the pad; thus, the coin is spaced from the next coin upstream. Put another way, the first segment 190 receives coins from the entry channel 132 and the second segment 192 is disposed in a position that is substantially more in direction of movement of said rotatable disc 114 for creating an increased spacing between adjacent coins. Accordingly, the coins moving through the second segment 192 are spaced apart. According to one embodiment of the present invention, the coins are spaced apart by a time of approximately five milliseconds when the sorting head 112 has an eleven inch diameter and the pad 118 rotates at a speed of approximately three hundred revolutions per minute (300 r.p.m.). According to an alternative embodiment, the coins are spaced apart by a distance of less than about two inches when the sorting head 112 has an eleven inch diameter and the pad 118 rotates at a speed of about 350 r.p.m.

Referring back to FIG. 2, as the coins move into the discrimination region 202 of the second segment 194, the coins move across ramp 196 and transition to a flat surface of the discrimination region 202 as the pad 118 continues to rotate. Put another way, the two stepped surfaces 182, 186 of the queuing channel 166 transition into the flat surface of the discrimination region 202 towards the downstream end of the second segment 194. The pad 118 holds each coin flat against the flat surface of the discrimination region 202 as the coins are moved past the discriminator sensor 204 in the downstream second segment 194.

The sorting head 112 includes a cutout for the discrimination sensor 204. The discrimination sensor 204 is disposed just below the flat surface of the discrimination region 202. Likewise, a coin trigger sensor 206 is disposed just upstream of the discrimination sensor 204 for detecting the presence of a coin. Coins first move over the coin trigger sensor 206 (e.g., a photo detector or a metal proximity detector) which sends a signal to a controller indicating that a coin is approaching the coin discrimination sensor 204.

According to one embodiment, the coin discrimination sensor 204 is adapted to discriminate between valid and invalid coins. As discussed in the Background Section, use of the term "valid coin" refers to coins of the type to be sorted. Use of the term "invalid coin" refers to items being circulated on the rotating disc that are not one of the coins to be sorted. Any truly counterfeit coins (i.e., a slug) are always considered "invalid." According to another alternative embodiment of the present invention, the coin discriminator sensor 204 is adapted to identify the denomination of the coins and discriminate between valid and invalid coins.

Coin discrimination sensors suitable for use with the disc-type coin sorter shown in FIGS. 1 and 2 are describe in detail in U.S. Pat. Nos. 5,630,494 and 5,743,373, both of which are entitled "Coin Discrimination Sensor And Coin Handling System" and are incorporated herein by reference in their entries. Another coin discrimination sensor suitable for use with the present invention is described in detail in copending U.S. patent application Ser. No. 10/095,256 (Attorney Docket No. 47171-00361USPT) entitled "Sensor And Method For Discriminating Coins Of Varied Composition, Thickness, And Diameter," filed on Mar. 11, 2002, which is incorporated herein by reference.

As discussed above according to one alternative embodiment of the present invention, the discrimination sensor 204 discriminates between valid and invalid coins. Downstream of the discrimination sensor 204 is a diverting pin 210 disposed adjacent inner queuing wall 170 that is movable to a diverting position (out of the page as viewed in FIG. 2) and a home position (into the page as viewed in FIG. 2). In the diverting position, the diverting pin 210 directs coins off of inner queuing wall 170 and into a reject channel 212. The reject channel 212 includes a reject wall 214 that rejected coins abut against as they are off-sorted to the periphery of the sorting head 112. Off-sorted coins are directed to a reject area (not shown). Coin that are not rejected (i.e., valid coins) eventually engage an outer wall 252 of a gauging channel 250 where coins are aligned on a common radius for entry into the coin exit station area as is described in greater detail below.

According to one embodiment of the present invention, the diverting pin 210 is coupled to a voice coil (not shown) for moving the diverting pin between the diverting position and the home position. Using a voice coil in this application is a nontraditional use for voice coils, which are commonplace in acoustical applications as well as in servo-type applications. Typically, a discrete amount of voltage is applied to the voice coil for moving the windings of the voice coil a discrete amount within the voice coil's stroke length—the greater the voltage, the greater the movement. However, the Applicants have discovered that the when the voice coil is "flooded" with a positive voltage, for example, the voice coil rapidly moves the diverting pin 210 coupled thereto to the diverting position (i.e., the end of the voice coil's stroke length) within a very short time period that is less than the time it takes for the coins to move from the discrimination sensor 204 to the diverter pin 210 when increased spacing is encountered due to the queuing channel. The voice coil is then flooded with a negative voltage for rapidly moving the diverting pin 210 windings back to its home position.

A voice coil suitable for use with the present invention is described in U.S. Pat. No. 5,345,206, entitled "Moving Coil Actuator Utilizing Flux-Focused Interleaved Magnetic Circuit," which is incorporated herein by references in its entirety. As an example, a voice coil manufactured by BEI, Technologies, Inc. of San Francisco, Calif., model number LA15-16-024A, can move an eighth-inch (⅛ in) stroke (e.g., from the home position to the diverting position) in approximately 1.3 milliseconds, which is a speed of about 0.1 inch per millisecond, and can provide approximately twenty pounds of force in either direction. Other voice coils are suitable for use with the coin sorting system of FIG. 2.

Other types of actuation devices can be used in alternative embodiments of the present invention. For example, a linear solenoid or a rotary solenoid may be used to move a pin such as diverting pin 210 between a diverting position and a home position.

As the pad 118 continues to rotate, those coins not diverted into the reject channel 212 continue along inner queuing wall 170 to the gauging region 250. The inner queuing wall 170 terminates just downstream of the reject channel 212; thus, the coins no longer abut the inner queuing wall 170 at this point and the queuing channel 166 terminates. The radial position of the coins is maintained, because the coins remain under pad pressure, until the coins contact an outer wall 252 of the gauging region 252. According to one embodiment of the present invention, the sorting head 112 includes a gauging block 254 which extends the outer wall 252 beyond the outer periphery of the sorting head 112. The gauging block 254 is useful when processing larger diameter coins such as casino tokens, $1 coins, 50¢ pieces, etc. that extend beyond he outer periphery of the sorting head 112. According to the embodiment of the sorting head 112 shown in FIG. 2, the gauging channel 250 includes two stepped surfaces to form rails similar to that described above in connection with the queuing channel 166. In alternative embodiments, the gauging channel 250 does not include two stepped surfaces.

The gauging wall 252 aligns the coins along a common radius as the coins approach a series of coin exit channels 261-268 which discharge coins of different denominations. The first exit channel 261 is dedicated to the smallest coin to be sorted (e.g., the dime in the U.S. coin set). Beyond the first exit channel 261, the sorting head 112 shown in FIG. 2 forms seven more exit channels 261-268 which discharge coins of different denominations at different circumferential locations around the periphery of the sorting head 112. Thus, the exit channels 261-268 are spaced circumferentially around the outer periphery of the sorting head 112 with the innermost edges of successive channels located progressively closer to the center of the sorting head 112 so that coins are discharged in the order of increasing diameter. The number of exit channels can vary according to alternative embodiments of the present invention.

The innermost edges of the exit channels 261-268 are positioned so that the inner edge of a coin of only one particular denomination can enter each channel 261-268. The coins of all other denominations reaching a given exit channel extend inwardly beyond the innermost edge of that particular exit channel so that those coins cannot enter the channel and, therefore, continue on to the next exit channel under the circumferential movement imparted on them by the pad 118. To maintain a constant radial position of the coins, the pad 118 continues to exert pressure on the coins as they move between successive exit channels 261-268.

According to one embodiment of the sorting head 112, each of the exit channels 261-268 includes a coin counting sensor 271-278 for counting the coins as coins pass though and are discharged from the coin exit channels 261-268. In an embodiment of the coin processing system utilizing a discrimination sensor capable of determining the denomination of each of the coins, it is not necessary to use the coin counting sensors 271-278 because the discrimination sensor 204 provides a signal that allows the controller to determine the denomination of each of the coins. Through the use of the system controller (FIG. 6), a count is maintained of the number of coins discharged by each exit channel 261-268.

Figure 6:
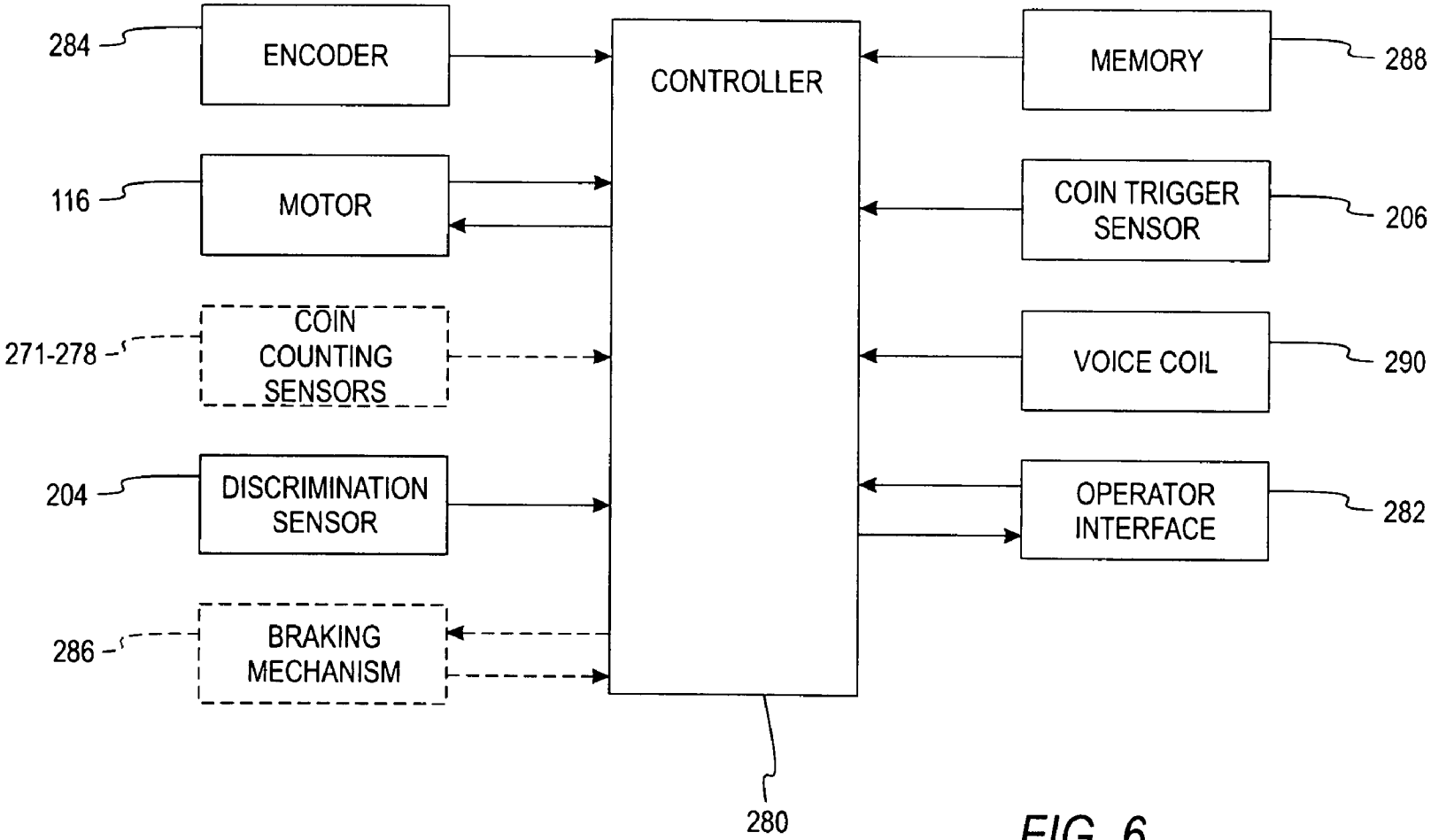
FIG. 6 is a functional block diagram of the control system for the a coin processing system shown in FIG. 1.

FIG. 6 illustrates a system controller 280 and its relationship to the other components in the coin processing system 100. The operator communicates with the coin processing system 100 via an operator interface 282 for receiving information from an operator and displaying information to the operator about the functions and operation of the coin processing system 100. The controller 280 monitors the angular position of the disc 114 via an encoder 284 which sends an encoder count to the controller 280 upon each incremental movement of the disc 114. Based on input from the encoder 284, the controller 280 determines the angular velocity at which the disc 114 is rotating as well as the change in angular velocity, that is the acceleration and deceleration, of the disc 114. The encoder 284 allows the controller 280 to track the position of coins on the sorting head 112 after being sensed. According to one embodiment of the coin processing system 100, the encoder has a resolution of 2000 pulses per revolution of the disc 114.

Furthermore, the encoder 284 can be of a type commonly known as a dual channel encoder that utilizes two encoder sensors (not shown). The signals that are produced by the two encoder sensors and detected by the controller 280 are generally out of phase. The direction of movement of the disc 114 can be monitored by utilizing the dual channel encoder.

The controller 280 also controls the power supplied to the motor 116 which drives the rotatable disc 114. When the motor 116 is a DC motor, the controller 280 can reverse the current to the motor 116 to cause the rotatable disc 114 to decelerate. Thus, the controller 270 can control the speed of the rotatable disc 114 without the need for a braking mechanism.

If a braking mechanism 280 is used, the controller 280 also controls the braking mechanism 286. Because the amount of power applied is proportional to the braking force, the controller 280 has the ability to alter the deceleration of the disc 114 by varying the power applied to the braking mechanism 286.

According to one embodiment of the coin processing 100, the controller 280 also monitors the coin counting sensors 271-278 which are disposed in each of the coin exit channels 261-268 of the sorting head 112 (or just outside the periphery of the sorting head 112). As coins move past one of these counting sensors 271-278, the controller 280 receives a signal from the counting sensor 271-278 for the particular denomination of the passing coin and adds one to the counter for that particular denomination within the controller 280. The controller 280 maintains a counter for each denomination of coin that is to be sorted. In this way, each denomination of coin being sorted by the coin processing system 100 has a count continuously tallied and updated by the controller 280. The controller 280 is able to cause the rotatable disc 114 to quickly terminate rotation after a "n" number (i.e., a predetermined number) of coins have been discharged from an exit channel, but before the "n+1" coin has been discharged. For example, it may be necessary to stop the discharging of coins after a predetermined number of coins have been delivered to a coin receptacle, such as a coin bag, so that each bag contains a known amount of coins, or to prevent a coin receptacle from becoming overfilled. Alternatively, the controller 280 can cause the system to switch between bags in embodiments having more than one coin bag corresponding to each exit channel.

The controller 280 also monitors the output of coin discrimination sensor 204 and compares information received from the discrimination sensor 204 to master information stored in a memory 288 of the coin processing system 100 including information obtained from known genuine coins. If the received information does not favorably compare to master information stored in the memory 288, the controller 280 sends a signal to the voice coil 290 causing the diverting pin 210 to move to the diverting position.

According to one embodiment of the coin processing system 100, after a coin moves past the trigger sensor 206, the coin discrimination sensor 204 begins sampling the coin. The discrimination sensor 204 begins sampling the coins within about 30 microseconds ("μs") of a coin clearing the trigger sensor 206. The sampling ends after the coin clears a portion or all of the discrimination sensor 204. A coin's signature, which consists of the samples of the coin obtained by the discrimination sensor 204, is sent to the controller 280 after the coin clears the trigger sensor 206 or, alternatively, after the coin clears the discrimination sensor 204. As an example, when the coin processing system 100 operates as a speed of 350 r.p.m. and the sorting head 112 has a diameter of eleven inches, it takes approximately 3900 μs for a 1¢ Euro coin (having a diameter of about 0.640 inch) to clear the trigger sensor 206. A larger coin would take more time.

The controller 280 then compares the coin's signature to a library of "master" signatures obtained from known genuine coins stored in the memory 288. The time required for the controller 280 to determine whether a coin is invalid is dependant on the number of master signatures stored in the memory 288 of the coin processing system 100. According to one embodiment of the present invention, there are thirty-two master signatures stored in the memory 288, while other embodiments may include any practical number of master signatures. Generally, regardless of the number of stored signatures, the controller 280 determines whether to reject a coin in less than 250 μs.

After determining that a coin is invalid, the controller 280 sends a signal to activate the voice coil 290 for moving the diverting pin 210 to the diverting position. As shown in FIG. 2, the diverting pin 210 is located about 1.8 inches downstream from the trigger sensor 206 on the eleven inch sorting head. Assuming an operating speed of 350 r.p.m., for example, the controller 280 activates the voice coil 290 within about 7300 μs from the time that the coin crosses the trigger sensor 206. As discussed above, the voice coil 290 is capable of moving the diverting pin 210 approximately an ⅛ inch in about 1300 μs.

Therefore, assuming an eleven inch sorting disk, an operational speed of 350 r.p.m. and a trigger sensor 206, discrimination sensor 204 and a diverting pin 210 arrangement as shown in FIG. 2, about 11000 μs (11 milliseconds) elapses from the time a coin crosses the trigger sensor 206 until the diverting pin 210 is lowered to the diverting position. Thus, the diverting pin 210 is located less than about two inches downstream of the trigger sensor 206. Accordingly, the spacing between coins crossing the trigger sensor 206 is less than about two inches.

Once the diverting pin 210 is moved to the diverting position, the diverting pin 210 remains in the diverting position until a valid coin is encountered by the discrimination sensor 204 according to one embodiment of the present invention. This reduces wear and tear on the voice coil 190. For example, the diverting pin 210 will only be moved to the diverting position one time when three invalid coins in a row are detected, for example, in applications involving a heavy mix of valid and invalid coins. If the fourth coin is determined to be a valid coin, the diverting pin 210 is moved to its home position. Further, according to some embodiments of the coin processing system 100, the diverting pin 210 is moved to the home position if the trigger sensor 206 sensor does not detect a coin within about two seconds of the last coin that was detected by the trigger sensor 206, which can occur when a batch of coins being processed in nearing the end of the batch. This reduces wear and tear on the pad 118, which is rotating beneath the diverting pin 210, because the diverting pin 210 and the rotating pad 118 are in contact when the diverting pin 210 is in the diverting position.

Because of the spacing imparted to the coins via the L-shaped queuing channel 166, it is not necessary to slow or stop the machine to off-sort the invalid coins. Rather, the combination of the increased spacing and fast-activating voice coil 290 contribute to the ability of the coin sorter system illustrated in FIGS. 1 and 2 to be able to discriminate coins on the fly.

The superior performance of coin processing systems according to one embodiment of the present invention is illustrated by the following example. Prior art coin sorters, such as those discussed in the Background Section where is was necessary to stop and then jog the disc to remove an invalid coin, that utilized an eleven inch sorting disc were capable of sorting a retail mix of coins at a rate of about 3000 coins per minute when operating at a speed for about 250 r.p.m. (A common retail mix of coins is about 30% dimes, 28% pennies, 16% nickels, 15% quarters, 7% half-dollar coins, and 4% dollar coins.) The ability to further increase the operating speed of these prior art devices is limited by the need to be able to quickly stop the rotation of the disc before the invalid coin is discharged as is discussed in the Background Section. According to one embodiment of the coin processing system 100 of FIGS. 1 and 2, the system 100 is cable of sorting a retail mix of coins at a rate of about 3300 coins per minute when the sorting head 112 has a diameter of eleven inches and the disc is rotated at about 300 r.p.m. According to another embodiment of the present invention, the coin processing system 100 is capable of sorting a "Euro financial mix" of coins at rate of about 3400 coins per minute, wherein the sorting head 112 has a diameter of eleven inches and the disc is rotated at about 350 r.p.m. (A common Euro financial mix of coins made up of about 41.1% 2 euro coins, about 16.7% 1 euro coins, about 14.3% 50¢ Euro coins, about 13.0% 20¢ Euro coins, about 11.0% 10¢ Euro coins, about 12.1% 5¢ coins and about 8.5% 1¢ Euro coins.)

In one embodiment of the coin processing system 100, the coin discrimination sensor 210 determines the denomination of each of the coins as well as discriminates between valid and invalid coins, and does not include coin counting sensors 271-278. In this embodiment, as coins move past one the discrimination sensor 204, the controller 280 receives a signal from discrimination sensor 204. When the received information favorably compares to the master information, a one is added to a counter for that particular determined denomination within the controller 280. The controller 280 has a counter for each denomination of coin that is to be sorted. As each coin is moved passed the discrimination sensor 204, the controller 280 is now aware of the location of the coin and is able to track the angular movement of that coin as the controller receives encoder counts from the encoder 284. Therefore, referring back to the previous coin bag example, the controller 280 is able to determined at the precise moment at which to stop the rotating disc 114 such that the "nth" coin is discharged from a particular output channel 261-286, but the "n+1" coin is not. For example, in an application requiring one thousand dimes per coin bag, the controller counts number of dimes sensed by the discrimination sensor 204 and the precise number of encoder counts at which it should halt the rotation of the disc 114—when the 1000th dime is discharged from the coin exit channel, but not the 1001st dime.

Figure 7A:
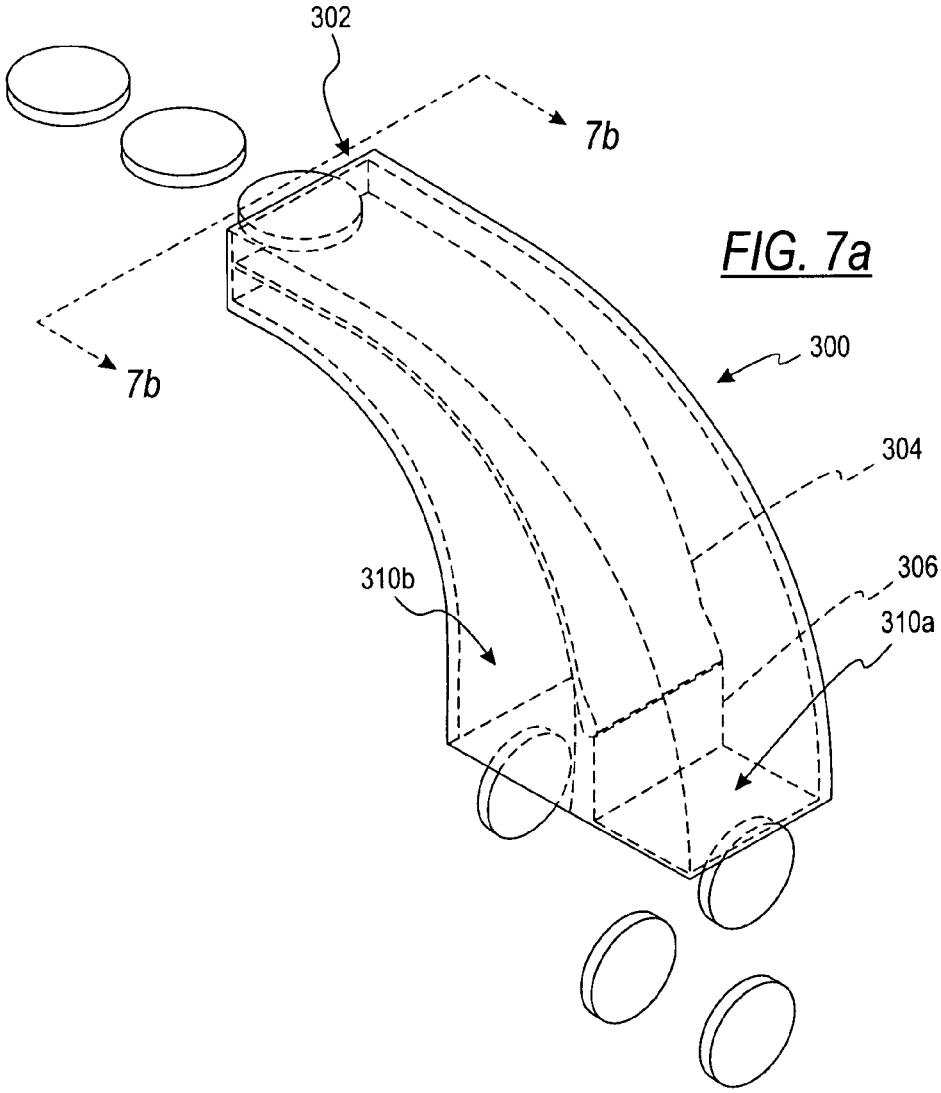
FIG. 7a is a perspective view of an external diverter according to one alternative embodiment of the present invention.
Figure 7B:
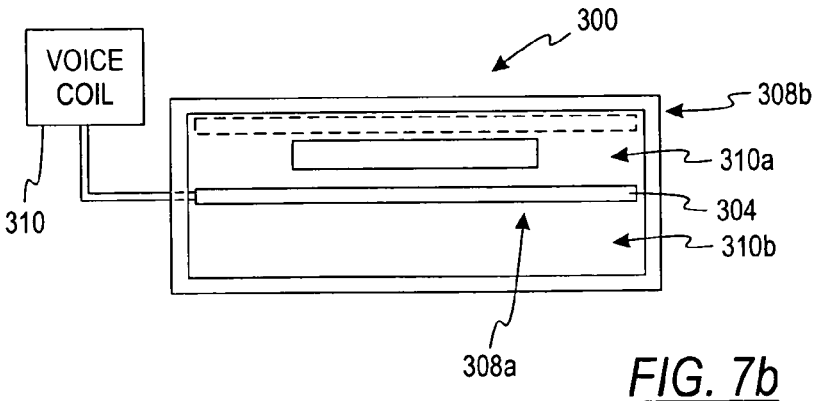
FIG. 7b is a front end view of the external diverter shown in FIG. 7a taken along line 7b-7b.

Referring now to FIGS. 7a and 7b, an external diverter 300 for use with an alternative embodiment of coin processing system 100 is shown. A plurality of external diverters 300 are arranged circumferentially around the sorting head 112 such that an inlet 302 of each external diverter 300 is disposed adjacent to each exit channel 261-268 for receiving coins discharged therefrom. The external diverters are used for separating valid and invalid coins according to one alternative embodiment of the coin processing system 100 in place of the voice coil 290 and pin 210. In another alternative embodiment, the diverter 300 works in connection with the voice coil 290 and pin 210 and functions to separate valid coins into two batches, rather than to separate invalid from valid coins.

The external diverter 300 includes an internal partition 304 that pivots about a base 306 between a first position 308a and a second position 308b wherein coins are directed down a first coin path 310a and a second coin path 310b, respectively. The internal partition 304 is coupled to a voice coil 310 for rapidly moving the internal partition 304 between the first and second positions 308a, b. In an alternative embodiment, the external diverter 300 is constructed such that the internal partition 304 moves from side-to-side (not up and down) to route coins between the two coin paths 310a, b.

According to one alternative embodiment of the coin processing system 100, the external diverters 300 are used in place of the diverting pin 210 (FIG. 2) for discriminating between valid and invalid coins. When an invalid coin is sensed by discrimination sensor 204 (FIG. 2), the controller 280 (FIG. 6) activates the voice coil 310 of the external diverters so that the invalid coin is directed down a second coin path 310b. The controller 280, with input from the encoder 284, is able to track the angular position of the invalid coin around the sorting head 112 as the pad 118 rotates. For each exit channel 261-268 and each corresponding external diverter 300, the controller 280 activates the voice coil 310 after a coin preceding the identified invalid coin has moved passed the exit channel 261-268, but before the identified invalid coin has reached the exit channel 261-268. For example, if the invalid coin has a diameter appropriate for the first exit channel 261, the invalid coin will be discharged from the first exit channel 261 into the second coin path 310b of the external diverter 300. The controller 280 sends a signal to the voice coil 310 to return internal partition 304 of the external diverter to the first position 308a before the coin immediately following the invalid coin reaches the first exit channel. The controller 280 repeats this sequence for each external diverter disposed around the sorting head. According to another alternative embodiment of the coin processing system 100, the controller is able to determine the diameter of each of the invalid coins using one or more sensors in the discrimination region 202 including the discrimination sensor 204; therefore, the controller 204 only activates the external diverter 300 of the exit channel 261-268 that is appropriate for the determined diameter of the invalid coin.

According to one alternative embodiment of the coin processing system 100, the external diverters 300 are used in connection with the sorting head of FIG. 2 which includes the diverting pin 210 (FIG. 2). The diverting pin 210 is used to off-sort invalid coins as described in connection with FIG. 2. The external diverters are used to separate the valid coins into two different batches. For example, in some applications the coin processing system 100 uses dual bag holders for each denomination and a predetermined number of coins discharged to each coin bag. The controller 280 maintains of a count of the coins discharged from each output receptacle and activates the external diverter 300 for routing coins to a second bag before the next coin is discharged from the corresponding exit channel 261-286. Again, because the controller 280 is tracking the angular movement of the disc 114 via the encoder 284, the controller 280 knows the precise moment that an identified valid coin is going to reach and be discharged from an exit channel.

Again, the generally L-shaped queuing channel 166 imparts a spacing to the coins allowing the coin processing system 100 to utilize the external diverters 300, which are rapidly actuated by the voice coils, on the fly. Accordingly, it is not necessary to slow or stop the rotating disc 144 when off-sorting invalid coins or routing coins down an alternate coin path.

Figure 8:
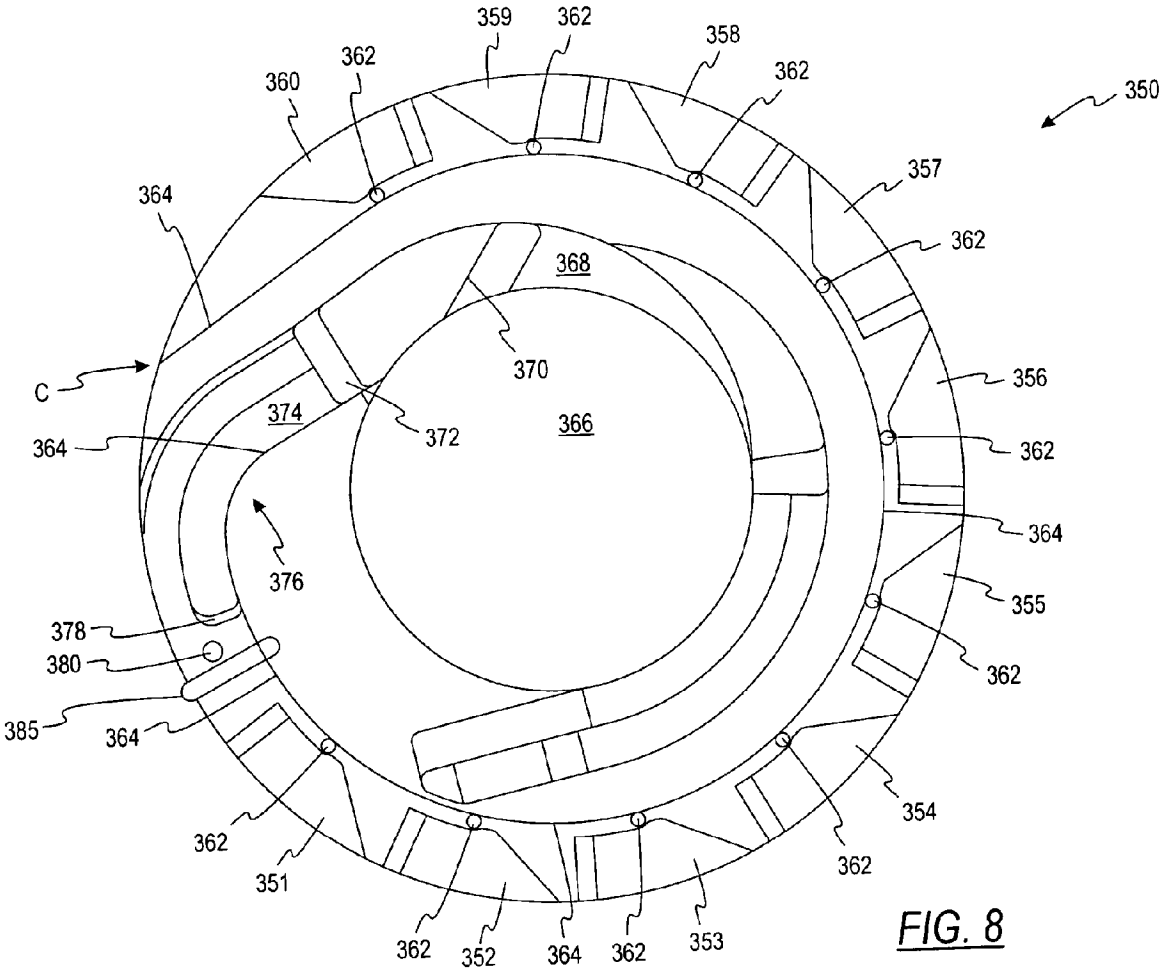
FIG. 8 is a bottom view of a programmable sorting head that can be used with the coin processing system of FIG. 1 instead of the sorting head shown in FIG. 2.

Referring now to FIG. 8, a programmable sorting head 350 is shown for use in an alternative embodiment of the coin processing system 100 of FIG. 1. Very generally, the exit channels 351-360 of the programmable sorting head 350 are substantially the same size so that coins of any denomination can be discharged out of any exit channel 351-360. Thus, the programmable sorting head 350 does not sort coins on the basis of diameter size; rather, coins are discriminated on the basis of information obtained from a discrimination sensor and are selectively distributed from the sorting head 350. Each of the exit channels 351-360 function similar to that of the reject channel 212 of FIG. 2. A diverting pin 362 is disposed adjacent each exit channel 351-360 and moves downward (out of the page in FIG. 8) to a diverting position for ejecting coins off of an inner queuing wall 364 into the corresponding exit channel 351-360.

The programmable sorting head 350 operates in a manner similar to the sorting head 112 described in connection with FIG. 2. Coins that are deposited on the rotating pad 118 via a central opening 366 in the programmable sorting head 350 initially enter an entry channel 368. As the pad 118 continues to rotate, coins are moved past a stripping notch for stripping stacked coins and then across a ramp, for increasing the pad pressure, into a queuing channel 374 having an inner queuing wall 364. In the embodiment of the programmable sorting head 350 depicted in FIG. 8, the queuing channel 374 includes three stepped surfaces and three rails (as opposed to two stepped surfaces and two rails for the sorting head 112 in FIG. 2). Alternatively, the queuing channel 374 consists of one surface.

The queuing channel 374 of the programmable sorting head 350 is L-shaped for imparting a spacing to the coins as the coins are moved past the corner 376 of the L-shaped queuing channel 374. The L-shaped queuing channel 374 of FIG. 8 imparts spacing to adjacent coins in the same manner as does the L-shaped queuing channel 166 described in connection with FIG. 2. Coins turning the corner 376 of the queuing channel 374 are accelerated and spaced-apart and engage the inner queuing channel wall 364. As the pad 118 continues to rotate, the coins aligned along wall 364 are move across a ramp 378 which transitions the coins to a flat surface for moving the coins past a coin trigger sensor 380 and a coin discrimination sensor 382.

The coin discrimination sensor 382 is adapted to discriminate between valid and invalid coins and to determine the denomination of each of the coins passing under the sensor 382. The function of the trigger sensor 380 and the discrimination sensor 382 is similar to that described in connection with FIG. 2. By processing input from the sensors 380, 382 and the encoder 284, the controller 280 tracks the angular position of each coin and is able to calculate the precise time to active a voice coil coupled to a pin 362 disposed adjacent to an exit channel 362. For example, if the coin discrimination sensor 382 determines that a coin is a dime and the coin sorting system is operating pursuant to a mode wherein dimes are to be off-sorted at the first exit channel 351, the pin 362 is lowered to the diverting position after the coin preceding the dime is moved past the first exit channel 351, but before the dime reaches the first exit channel. As the pad continues to rotates, the dime contacts the pin 362 and is knocked off the inner wall 365 into the first exit channel 351. The controller 280 raises the pin 362 before the next coin reaches the first exit channel 351. Put another way, the time to retract the pin 362 is less tan the time for the next coin to pass the pin 362 due to the increased spacing imparted to the coins by the L-shaped queuing channel 374.

In various alternative embodiments of the coin processing system 100 utilizing the programmable sorting head 350 ("the programmable processing system"), the programmable processing system operates pursuant to many predefined modes of operation and user-defined modes of operation. For example, the first exit channel 351 can operate as a reject chute for off-sorting invalid coins. In another embodiment, none of the exit channels 351-360 serve as reject chutes; rather, invalid coins are moved along wall 364 around the sorting head 350 and follow wall 364 off the sorting head at a point "C" where the coins are discharged to another off-sort area. In another application such as in the processing of coins obtained from vending machines, the first three exit channel 351-353 are used to sort nickels, dimes and quarters, respectively, until a predetermined number of coins of a denomination are delivered to the respective exit channel 351-353. Then the controller causes nickels, dimes and quarters to be off-sorted at the fourth, fifth and sixth exit channels 354-356, respectively, and so on. Accordingly, after a predetermined number of nickels have been discharged by the first exit channel 351, nickels are then off-sorted at the fourth exit channel 354, and then the by the seventh exit channel 357. No more than the predetermined number of coins are discharged from the exit channels 351-359 and the subsequent exit channel assigned to nickels, for example, is not utilized until the previous exit channel assigned to nickels has discharged a predetermined number of coins.

In another embodiment of the present invention, the programmable coin processing system operates pursuant to a mode of operation wherein the first ten coin denominations detected by the coin discrimination sensor 382 are the coin denominations assigned to the ten exit channels 351-360, respectively, and all other coins are off-sorted by following wall 364 off the sorting head 350 at point "C." As is readily apparent, the programmable sorting system can be utilized in pursuant to a myriad of modes of operation in alternative embodiments of the system.

In another embodiment of the present invention, the programmable coin processing system is utilized to separate coins from a plurality of coin sets—British pound coins, French Franc coins, German Deutschmark coins, U.S. coins, Italian Lira coins, Canadian coins and Euro coins, for example. The programmable coin processing system causes coins of each coin set to be distributed to one of the ten exit channels 351-360, while off-sorting other "invalid" coins. The programmable coins sorter can be linked to an external network which provides currency exchange rates so that the system can calculate the real-time value of all the coins processed from the different coin sets from different countries.

Figure 9:
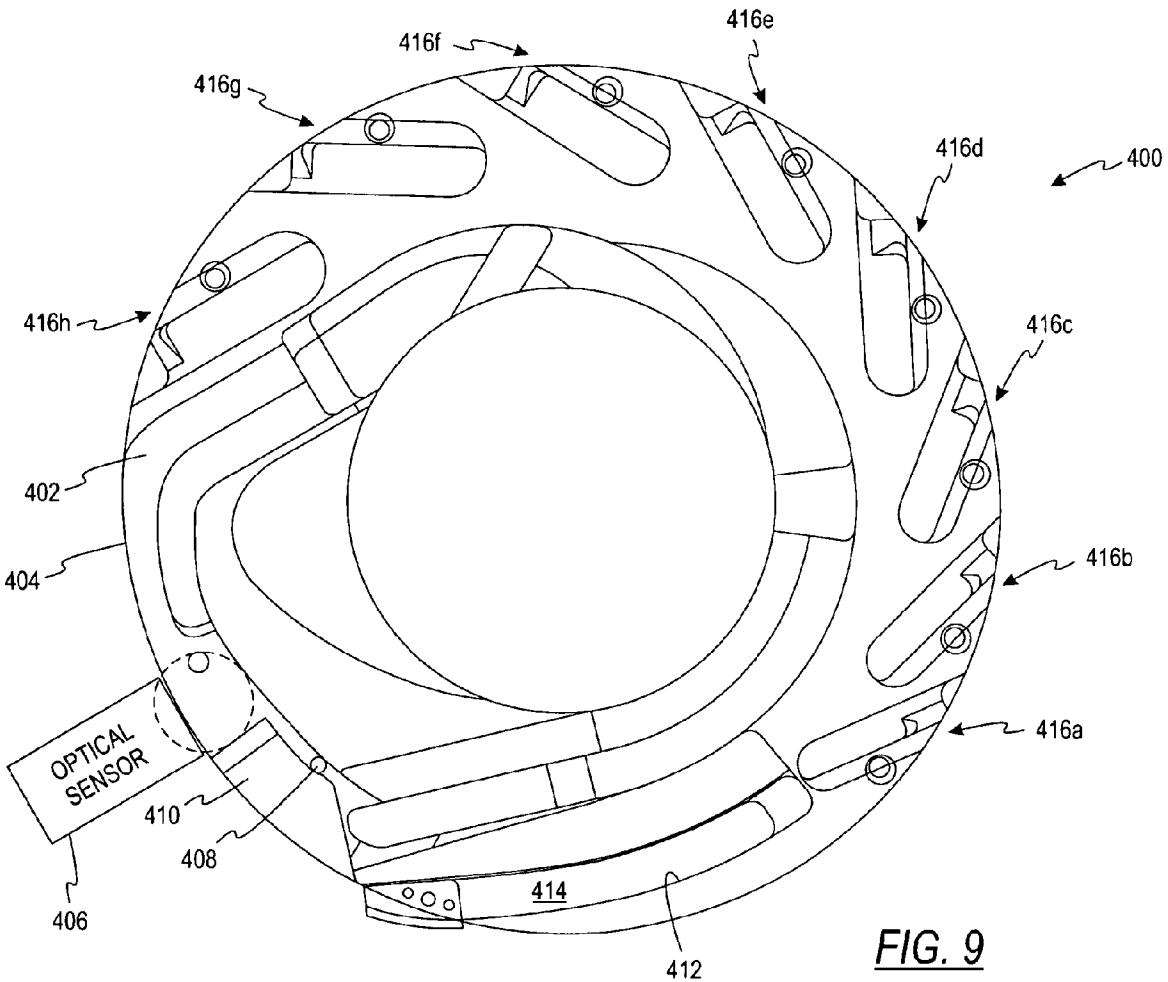
FIG. 9 is a bottom view of a sorting head and an external optical sensor that can be used with the coin processing system of FIG. 1 instead of the sorting head shown in FIG. 2.

In FIG. 9, an alternative embodiment of a sorting head 400 is shown for use with the coin processing system 100 of the present invention. While it will be recognized that the sorting head 400 is similar to the sorting head 112 shown in FIG. 2, the alternative embodiment to be discussed in connection with FIG. 9 is also applicable to a programmable coin sorting system such as that described in connection with FIG. 8.

The sorting head 400 is similar to that of FIG. 2 in that it is designed to impart spacing to adjacent coins; however, the queuing channel 402 is designed to move coins so that the outside edge of each of the coins extends beyond an outer periphery 404 of the sorting head 400 as the coins move past an optical sensor 406 for discriminating the coins. According to one embodiment, the optical sensor 406 is adapted to discriminate between valid and invalid coins. In another alternative embodiment, the optical sensor 406 is adapted to discriminate between valid and invalid coins and to identify the denomination of coins. The optical sensor 406 can comprise a photodetector, a charge-coupled device (CCD) detector, a metal oxide semiconductor (MOS) array, a line array, a camera, a scanning laser or other type of optical sensor according to various alternative embodiments.

The radial position of the queuing channel 402 is moved outward a distance such that the diameter of the smallest coin to be processed (e.g., the dime in the U.S. coin set) is moved beyond the outer periphery 404 of the sorting head 400 to obtain optical information from the coin. According to one embodiment, the coins must extend beyond the outer periphery 404 of the sorting head 400 at least about 0.010 inch (approximately 0.25 mm) for obtaining the optical information from the coin. A controller of the coin processing system 100 then processes the optical information obtained from each coin by the optical sensor 404. As the pad continues to rotate, the coin is brought back within the outer periphery 404 of the sorting head 400 as the coin moves past a diverting pin 408 and reject channel 410 similar to that described in connection with FIG. 2. Invalid coins are rejected via the reject channel 410 while valid coins are moved into engagement with an outer wall 412 of a gauging channel 414 for aligning the coins along a common radius as the coins approach the exit channels 416a-h.

Figure 10:
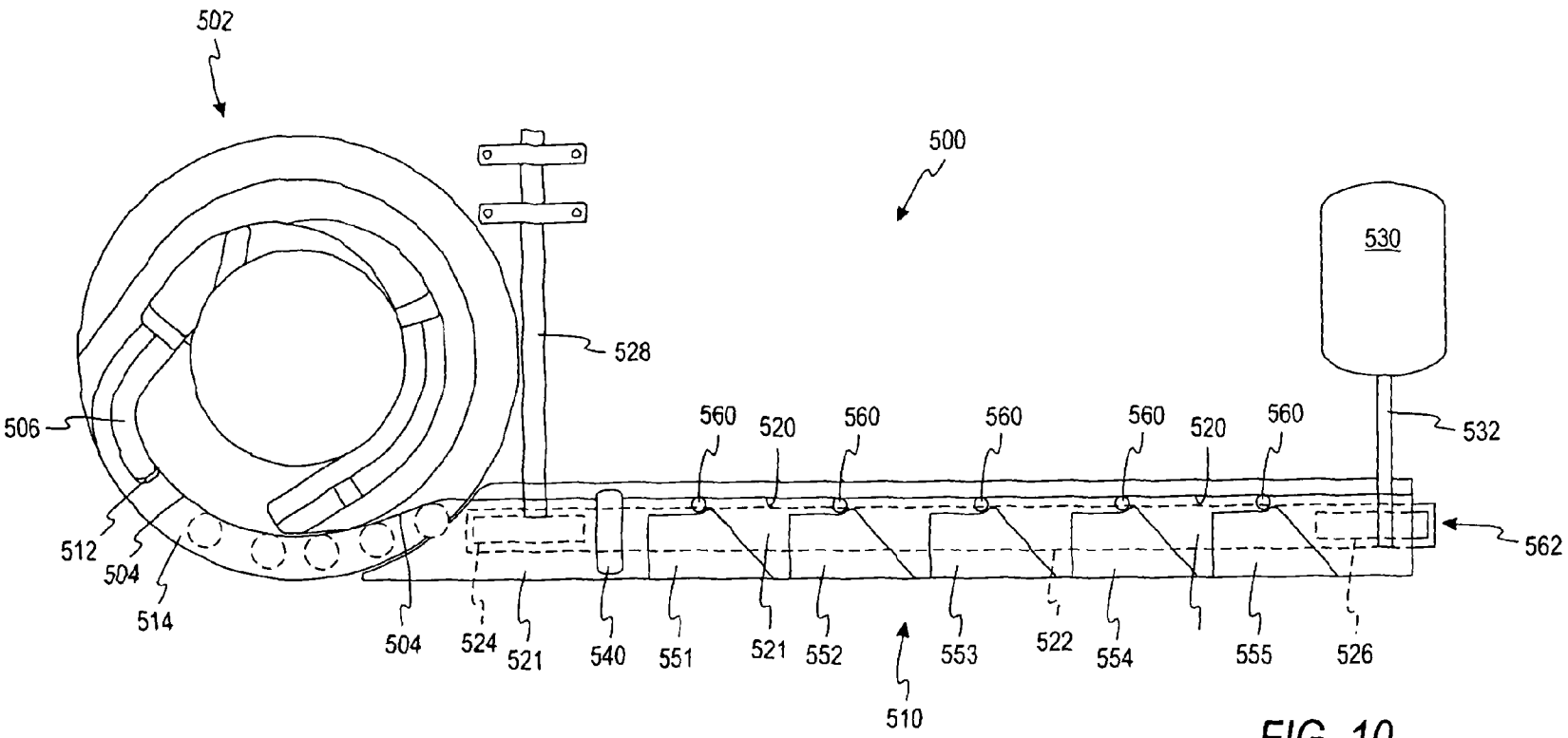
FIG. 10 is a top view of a programmable power rail coin processing system according to one alternative embodiment of the present invention.

Turning now to FIG. 10, a programmable power rail coin processing system 500 ("rail system 500") is shown according to an alternative embodiment of the present invention. The rail system 500 includes a guide plate 502 similar to the sorting head 350 shown and described in connection with FIG. 8. The guide plate 502 functions in substantially the same manner as the sorting head 350 in FIG. 8 by aligning coins, that are moved by a rotating disc, along an inner queuing channel wall 504 of a queuing channel 506; however, the guide plate 502 does not sort the coins. Rather, the coins are sorted along a rail 510 as is described in greater detail below.

It should be noted that the while underside of the guide plate 502 is shown in FIG. 10, the surface of the guide plate 502 shown in FIG. 10 faces downward while the rail 510 would face upward as shown in actual operation of the rail sorter 500. As with the sorting head in FIGS. 2 and 8, the queuing channel 506 of the guide plate 502 is generally L-shaped for imparting a spacing between adjacent coins. As the rotatable disc (similar to disc 114 of FIG. 1) continues to rotate, the coins are moved over a ramp 512 on to a flat surface 514 and along a wall 504. The guide plate 502 does not include any exit channels. Further, the guide plate 502 does not include a coin discrimination sensor as it can be disposed on the rail 510. Rather, the coins continue along the inner queuing wall 504 and are moved onto the rail 510 and into engagement with a wall 520 of the rail 510 while the underside of each coin contacts a flat surface 521 of the rail 510.

Figure 11:
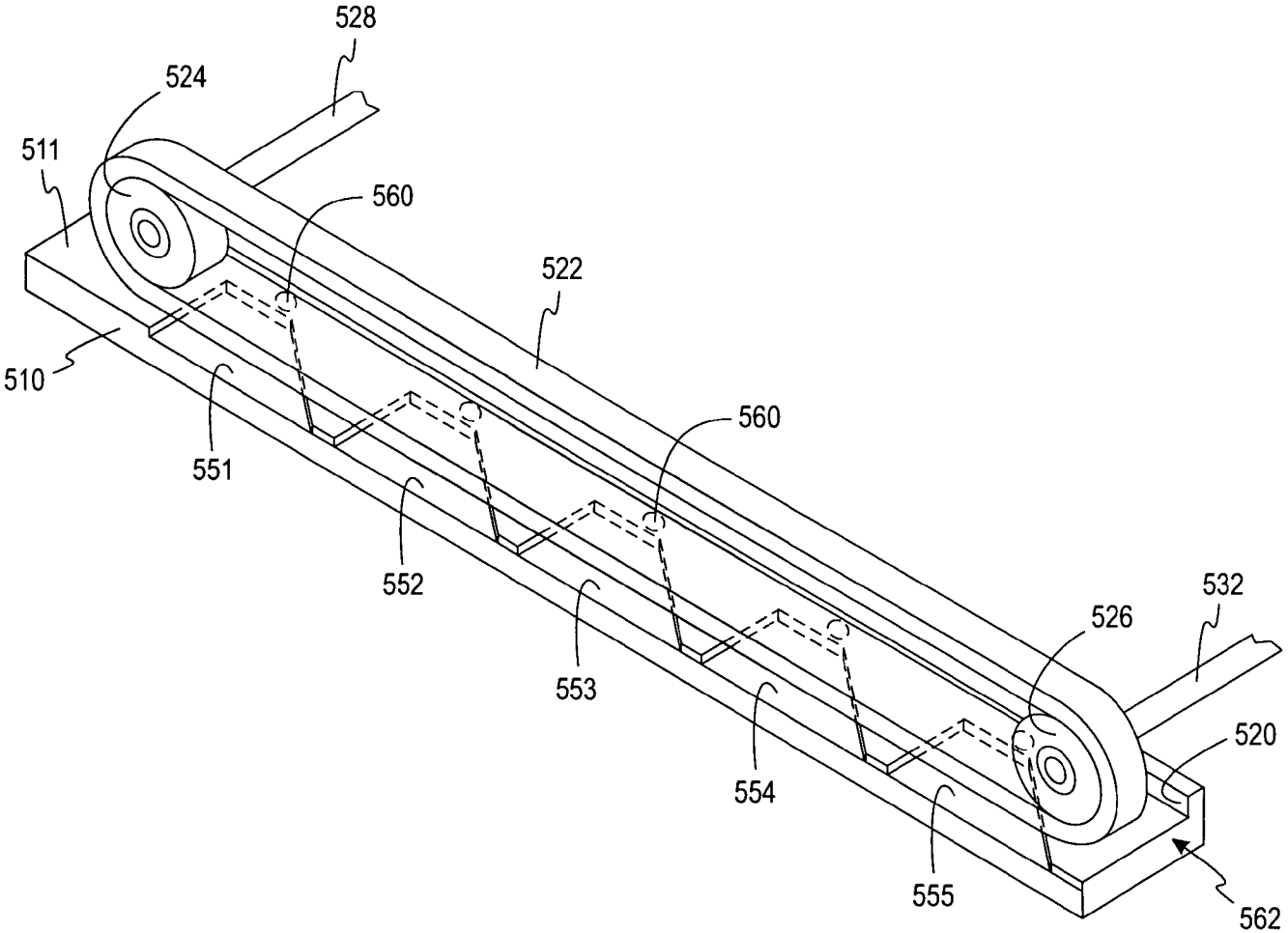
FIG. 11 is a perspective view of a rail and an endless belt for use with the programmable power rail coin processing system of FIG. 10.

Referring also to FIG. 11, an endless belt 522 that is looped around two pulleys 524, 526 is disposed along the longitudinal axis of the rail 510 and is disposed above the rail 510 a distance less than the thickness of the thinnest coin. (Note that the endless belt 522 is depicted with a dashed-line in FIG. 10.) The first pulley 524 rotates around a shaft 528 and the second pulley is driven by a motor 530 via another shaft 532. The belt 522, which is made out of a resilient material such as rubber, grips the coins as the upper surfaces of the coins come into contact with the belt 522 as the coins move from the guide plate 502 along the queuing wall 504 to the rail 510 and into engagement with the wall 520. The belt 522, which is in pressed engagement with the coins, moves the coins along the rail 510 while an underside of each coin slides along the flat surface 521 of the rail 510. The transition between the guide plate 502 and the rail 510 should appear substantially seamless to the coins so as not to decrease the spacing between the coins. The endless belt 522 moves at a speed sufficient to maintain the spacing between adjacent coins as the coins move onto the rail 510 and come under control of the belt 522. According to an alternative embodiment of the rail sorter 500, the belt 522 moves at a speed sufficient to increase the spacing between adjacent coins and no L-shaped queuing channel would be needed to increase spacing between adjacent coins in such an embodiment.

As the belt 522 continues to rotate, coins are moved past a coin discrimination sensor 540 for discriminating between invalid and valid coins and for determining the denomination of the coins. A plurality of coin exit channels 551-555 are disposed in the rail 520 downstream of the coin discrimination sensor 540. While five exit channels 551-555 are shown in the embodiment of the rail system 500 shown in FIG. 10, the length of the rail 510 and the endless belt 522 can be extended (or reduced) to accommodate any reasonable number of exit channels. Also included along the rail 510 are a plurality of diverting pins 560 disposed adjacent each coin exit channel 551-526 for obstructing a coin moving along the wall 520 and forcing the coin into the corresponding exit channel. The diverting pins 560 each move from a home position, wherein the pins disposed slightly below the surface 521 of the rail, to a diverting position extending beyond the surface 521 of the rail 510 for engagement with coins. Each of the diverting pins 560 are moved from the home position to the diverting position and back to the home position by a voice coil, which provides the advantage of rapid actuation.

Figure 12:
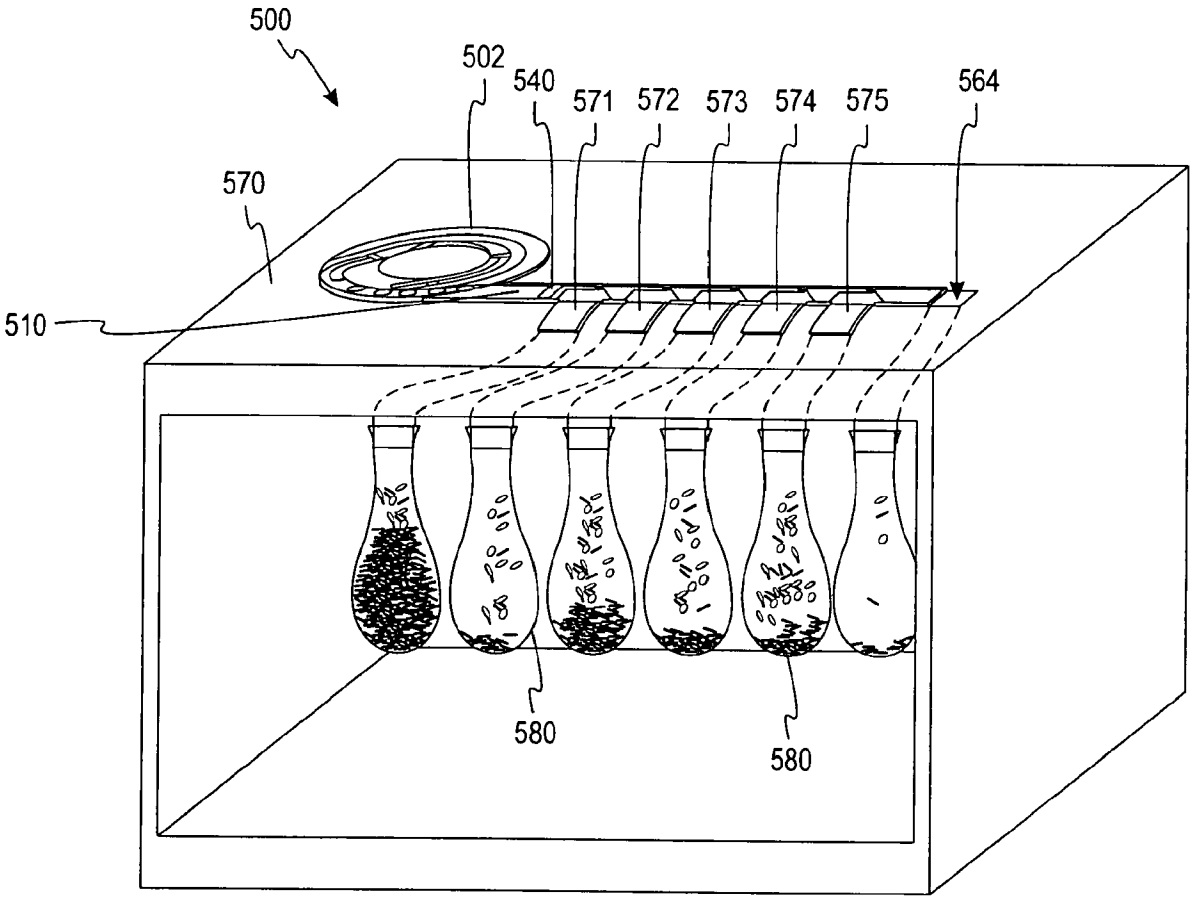
FIG. 12 is a perspective view of the programmable power rail coin processing system of FIG. 10 disposed within a cabinet according to one an alternative embodiment of the present invention.

An encoder (not shown) is coupled to one of the two pulleys 524, 526 and is interface with a controller of the rail system 500 for tracking the linear movement of the coins along the rail 510. As discussed above in connection with FIG. 8, the controller of the rail system 500 is interfaced with the coin discrimination sensor 540, the diverter pins 560 and the encoder for selectively diverting coins into the plurality of exit channel 551-555. Coins that are not selectively diverted into one of the plurality of exit channels 551-555 are moved off a downstream end 562 and fall into an invalid coin chute 564 (FIG. 12). Alternatively, invalid coins are off-sorted via one of the coin exit channels 551-555.

Similar to the sorting head depicted in FIG. 8, the rail system 500 is programmable. Each exit channel 551-555 is sized to accommodate coins of most any diameter. Accordingly, the rail sorter can be programmed to selectively discharge coins of any denomination out of any of the exit channels 551-555. For example, in one application, U.S. coins are sorted in order of increasing value—pennies, nickels, dimes, quarters, half dollar coins and dollar coins—rather than in order of increasing diameter.

Referring also to FIG. 12, the rail system 500 is disposed within a cabinet 570 for housing the rail sorter 500. (Note that the endless belt 522 and pulleys 524, 526 are not shown FIG. 12.) A plurality of coin tubes 571-575 are disposed along the rail 510 adjacent the exit channels 551-555 for receiving coins discharged from each of the exit channels 551-555 and routing the coins to coin receptacles such as coin bags 580 contained within the cabinet 570. A sixth coin tube 576 routs coins from the invalid coin chute 564 to a coin receptacle disposed with the cabinet 570.

The rail system 500 provides the advantage of presenting the coin bags 580 in a substantially liner fashion. Put another way, the exit channels 551-555 output coins in the same direction which facilities a substantially linear bag presentation. Therefore, an operator of the rail system 500 can easily access the coins bags 580 from the same side of the cabinet. In alternative embodiment of the rail sorter 500, dual coin bag holders for holding two coins bags can be attached to the end of each coin tube. Dual bag holders allow the rail system 500 to route coins of a single denomination to two different bags; thus, once a predetermined number of coins have been routed to a first bag the coins of that denomination are routed to a second bag.

In an alternative embodiment of the rail system 500, the guide plate 502 includes a discrimination region having a discrimination sensor and a reject channel as does the sorting head 112 of FIG. 2. Accordingly, the discrimination sensor on the guide plate 502 discriminates between valid and invalid coins and/or determines the denomination of the coins and invalid coins are off-sorted via the reject channel. Thus, no discrimination sensor is needed on the rail in such an embodiment.

In yet another alternative embodiment of the rail system, the rail and guide plate are formed from the same piece of material such that they are integral components. The rotating pad and endless belt are disposed on the same side of the integral rail and pad—either the top-side or the bottom-side. Alternatively still, a large rotating pad can impart movement to the coins along the integral guide plate and pad.

Figure 13:
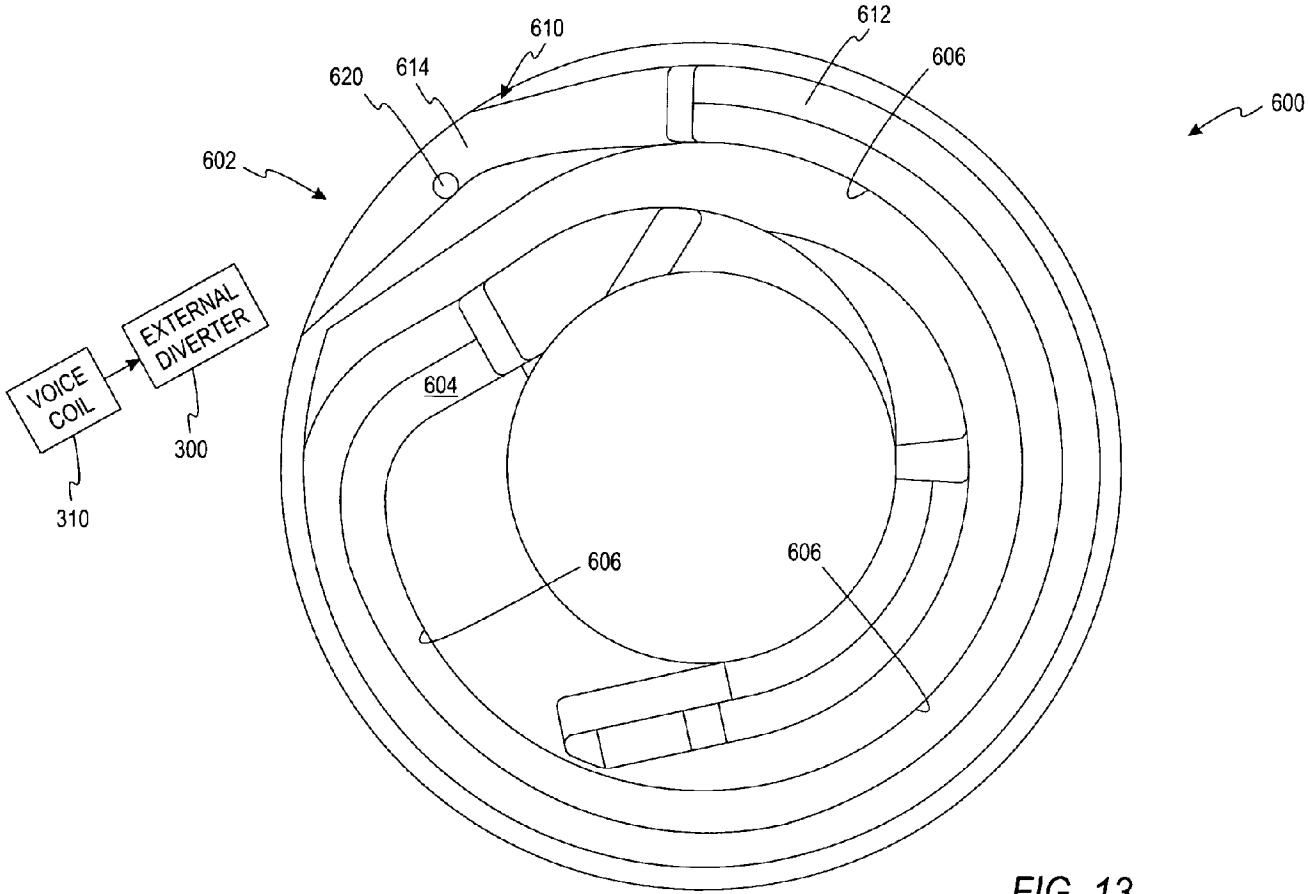
FIG. 13 is a bottom view of a sorting head having a single coin exit station that can be used with the coin processing system of FIG. 1 instead of the sorting head shown in FIG. 2.

Turning to FIG. 13, a sorting head 600 having a single exit station 602 is shown for use in an alternative embodiment of the coin processing system 100. The sorting head 600 operates in a similar manner as does the sorting heads described previously up until the point where the coins enter a queuing region 604 of the sorting head 600. In the queuing channel 604, the coins are aligned against an inner queuing wall 606, which extends around a substantial portion of the sorting head 600. At the downstream end, the queuing channel 604 includes a substantially "dog-leg-shaped" portion 610, which includes an first upstream segment 612 and a second downstream segment 614.

Similar to the generally L-shaped queuing regions described above in connection with FIGS. 2 and 8, the dog-leg-shaped portion 610 imparts a spacing to adjacent coins moving from the first segment 612 to the second downstream segment 614. As a pad (such as pad 118 of FIG. 1) rotates, the coins are pushed against inner wall 606 and travel along the inner wall 606 in a direction that is transverse to the direction in which the pad is rotating. This action aligns the coin against the wall 606. As the coins move from the first upstream segment 612 to the second downstream segment 614 of the queuing channel 166, the coins are turned in a direction wherein they are moving with the pad, which imparts spacing between adjacent coins.

As the pad continues to rotate, the coins are moved past a discrimination sensor 620 disposed along the queuing channel 604 for discriminating between valid and invalid coins and/or identifying the denomination of coins. The coins continue along the inner queuing channel wall 606 until the pad rotation causes the coins to be discharged from the single exit station 602. Note that that all coins entering the coin processing system described in connection with FIG. 13 thus far are discharged out of the single output channel 602.

An external diverter 300 actuated by a voice coil 310, such as described in connection with FIGS. 7a, b, receives coins discharged from the single output receptacle 602. A controller (not shown) monitors the output of the discrimination sensor 620 for selectively moving the internal partition 304 (FIGS. 7a, b) between the first and second positions 308a, b for routing coins to the first and second coins paths 310a, b. Alternatively, the external diverter is actuated by a solenoid.

The coin processing system described in connection with FIG. 13 can be used in applications wherein it is desirable to separate coins into two batches. For example, it may be desired to process U.S. dimes into batches of 1000 dimes each. In another application, it may be desired to separate valid coins from invalid coins. In another application, it may be desired to separate a mixed batch of coins such as a mix of U.S. coins and Euro coins into their respective coin sets. According to an alternative embodiment of the coin processing system described in connection with FIG. 13, the sorting head 600 includes a diverting pin and reject channel for off-sorting invalid coins prior to discharging valid coins from the single exit station 602. Such an embodiment can be used in an application wherein it is desired to separate Euro coins from U.S. coins, but to also remove invalid coins (e.g., coins from other coin sets and/or counterfeit coins).

Figure 14A:
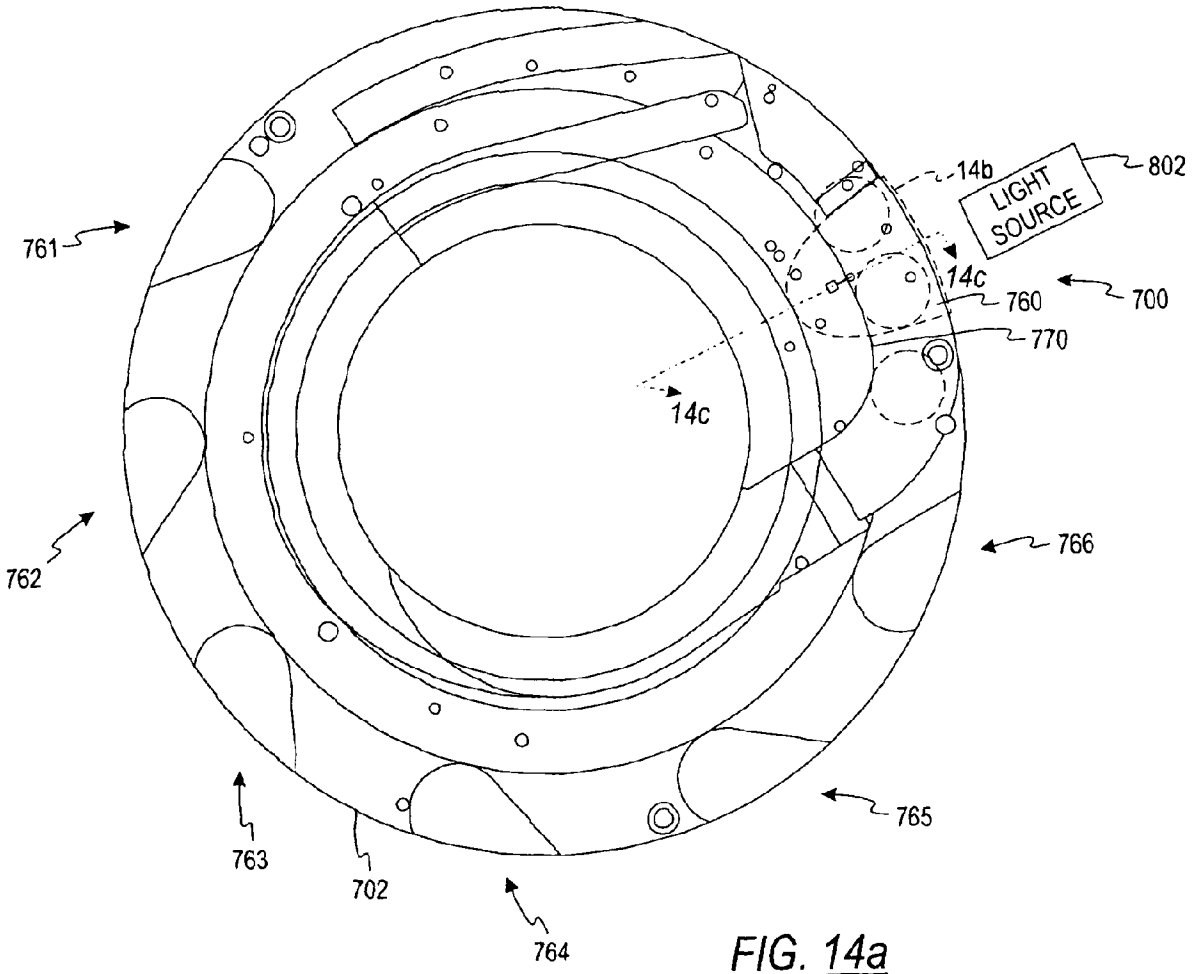
FIG. 14a is a bottom view of a sorting head according to one embodiment of the present invention for use with the system of FIG. 1.
Figure 14B:
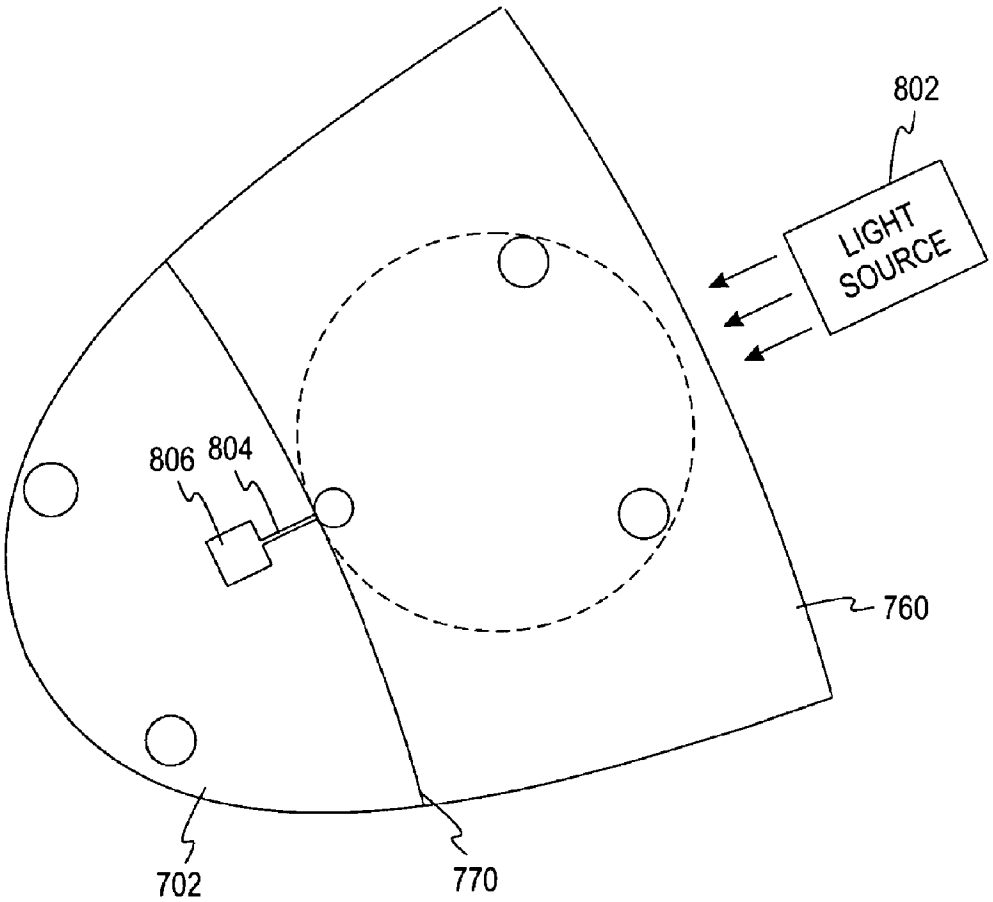
FIG. 14b is an enlarged view of a portion of the sorting head of FIG. 14a taken along line 14b showing an optical coin discrimination sensor according to one embodiment of the present invention.
Figure 14C:
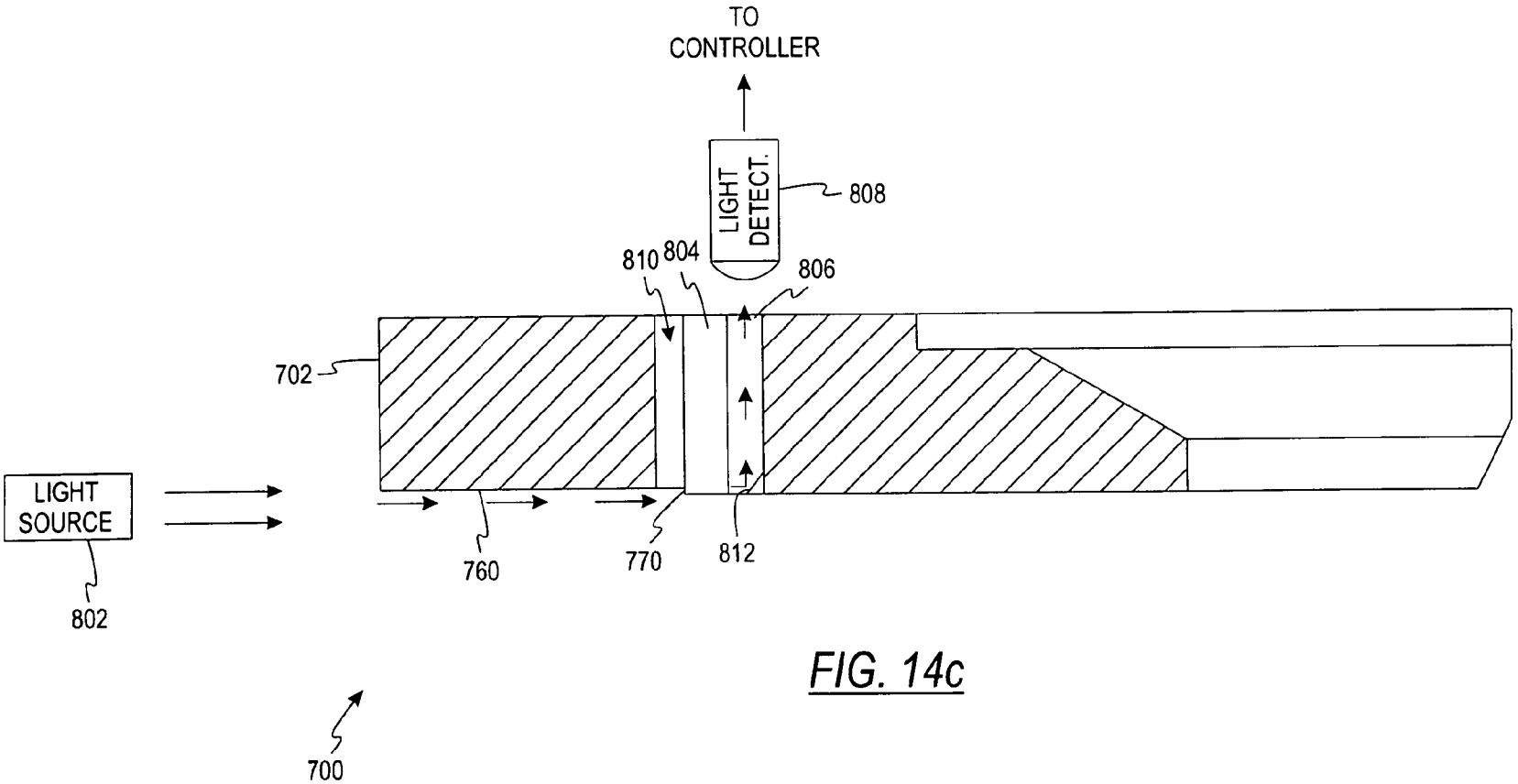
FIG. 14c is a cross-section view of the sorting head of FIG. 14a taken along line 14c showing an optical coin discrimination sensor according to one embodiment of the present invention.

Turning now to FIGS. 14a, 14b, and 14c, an optical coin discrimination senor 700 will be described. FIG. 14a shows the underside of a sorting head 702, which processes coins similar to that displayed in FIG. 2. The optical coin discrimination sensor 700 and sorting head 702 may be used with the disc-type coin processing system 100 of FIG. 1 according to one embodiment of the present invention. Coins are processed with the sorting head 702 similar to that described in the FIG. 2. As coins are aligned along the inner queuing wall 770 and moved along the queuing channel 766, the coins are moved toward the optical coin discrimination sensor 700 as the pad 118 (FIG. 1) continues to rotate. Exemplary coins are shown in dashed lines on the sorting head 702. As the coins are moved past the discrimination sensor 700, the discrimination sensor 700 is used to discriminate valid coins from invalid coins.

As the pad 118 continues to rotate, the coins are moved from the discrimination sensor 700 past the diverting pin 710 and the reject channel 714. The diverting pin 710 moves from a home position to a diverting position for diverting coins from the queuing wall 770 into the reject channel 714, as described above, in response to a coin being determined to be an invalid coin. Those coins not diverted from the queuing wall 770—wherein the diverting pin 710 is maintained in the home position—continue along the queuing wall 770 and eventually past the plurality of exit channels 761-766 as discussed above in connection with FIG. 2. In the sorting of coins from the U.S. coin set, for example, dimes are discharged from the first exit channel 761, pennies are discharged from the second exit channel 762, nickels are discharged from the third exit channel 763, half-dollar coins are discharged from the fourth exit channel 764, and dollar coins are discharged from the fifth exit channel 765. The sorting head 702 may include more or less than six exit channels in alternative embodiments of the present invention depending on the particular application and the desired number of coins to be sorted. In other embodiments, the exit channels 761-766 of the sorting head 702 may be similarly sized and used in connection with a plurality of diverters similar to that discussed in connection with FIG. 8, permitting the sorting head 702 to be used as a programmable sorting head.

The optical coin discrimination sensor includes a light source 802, a first light guide 804, a second light guide 806, and a light detector 808. Generally, the first and second light guides 802, 804 receive light from the light source 802 and guide the received light to the light detector 808. As a coin moves along the queuing channel 760 and past the first light guide 804, the opaque nature of the coins (shown in dashed lines in FIG. 14b) prevents the first light guide 804 from receiving the light emitted by the light source 802. As discussed below, the blocking of the first light guide 804 causes an interruption in the light beam, which prevents light from the light source 802 from illuminating the light detector 808, is used to discriminate that coin.

According to one embodiment of the present invention, the first light guide 804 is constructed of sapphire and is about 0.010 inch wide and about 0.150 inch deep. The first light guide may be constructed of another substantially optically clear material such as plastic or acrylic, for example, in alternative embodiments of the present invention. While only the bottom portion (as viewed in FIG. 14c) of the first light guide 804 is used in receiving light and directing the received light to the second light guide 406, the first light guide 804 has a length corresponding to the thickness of the sorting head 702 to facilitate the handling and placement of the first light guide 804 within the sorting head 702.

The second light guide 806 is constructed of a substantially optically clear material such as plastic, acrylic, sapphire, etc. according to alternative embodiments of the present invention. The second light guide has an angled back surface 812 for directing light received from the first light guide 804 toward the light detector 808 as illustrated in FIG. 14c. According to one embodiment of the present invention, the angled surface 812 is disposed at an about 45° angle relative to the horizontal. In alternative embodiments of the present invention, the first and second light guides 804, 806 may be integral components such that they are constructed from the same piece of material.

The light path is shown in FIG. 14c by a plurality of arrows. The path is generally horizontal from the light source 802 across the bottom surface of the sorting head 702 and through the first light guide 804 and into the second light guide 806. Within the second light guide 806, the light continues along a horizontal path (as viewed in FIG. 14c) until contacting the angled surface 812 of the second light guide 806 at which point the light is upwardly directed by the angled surface 812 at an about 90° angle. The light continues in the upward direction through the second light guide 806, which directs the light onto the light detector 808. According to the illustrated embodiment, the detector 808 is disposed proximate to the output end of the second light guide 806. In an alternative embodiment of the present invention, an optical fiber may be used to pipe light from the output end of the second light guide 806 to a detector disposed in a different location. The second light guide 806 has a cross section that is about 0.125 inch by 0.125 inch and has a length corresponding to the thickness of the sorting head 702 according to one embodiment of the present invention.

According to one embodiment of the present invention, the light source comprises a laser diode. The inventors have found a laser diode module commercially available from Optima Precision Inc. of West Linn, Oreg., Part No. DLM 2103-636, to be suitable for use in one embodiment of the present invention. This laser diode outputs light having a wavelength of about 623 nm. Other types of light sources may be used in alternative embodiments of the present invention such as, for example, semiconductive lamps, incandescent lamps, gas arc lamps, fluorescent lamps, or electrochemical lamps.

An aperture 810 in the sorting head 702 adjacent the first light guide 804 directs forced air from a nozzle (not shown) across the face of the first light guide 804 for removing debris that has accumulated during the processing of coins (e.g., dust, coin dust, oil, etc.) from the coin-contacting face of the first light guide 804. Additionally, the contact of the coins against the face of the first light guide 804 also removes, or at least loosens, any debris.

Figure 14D:
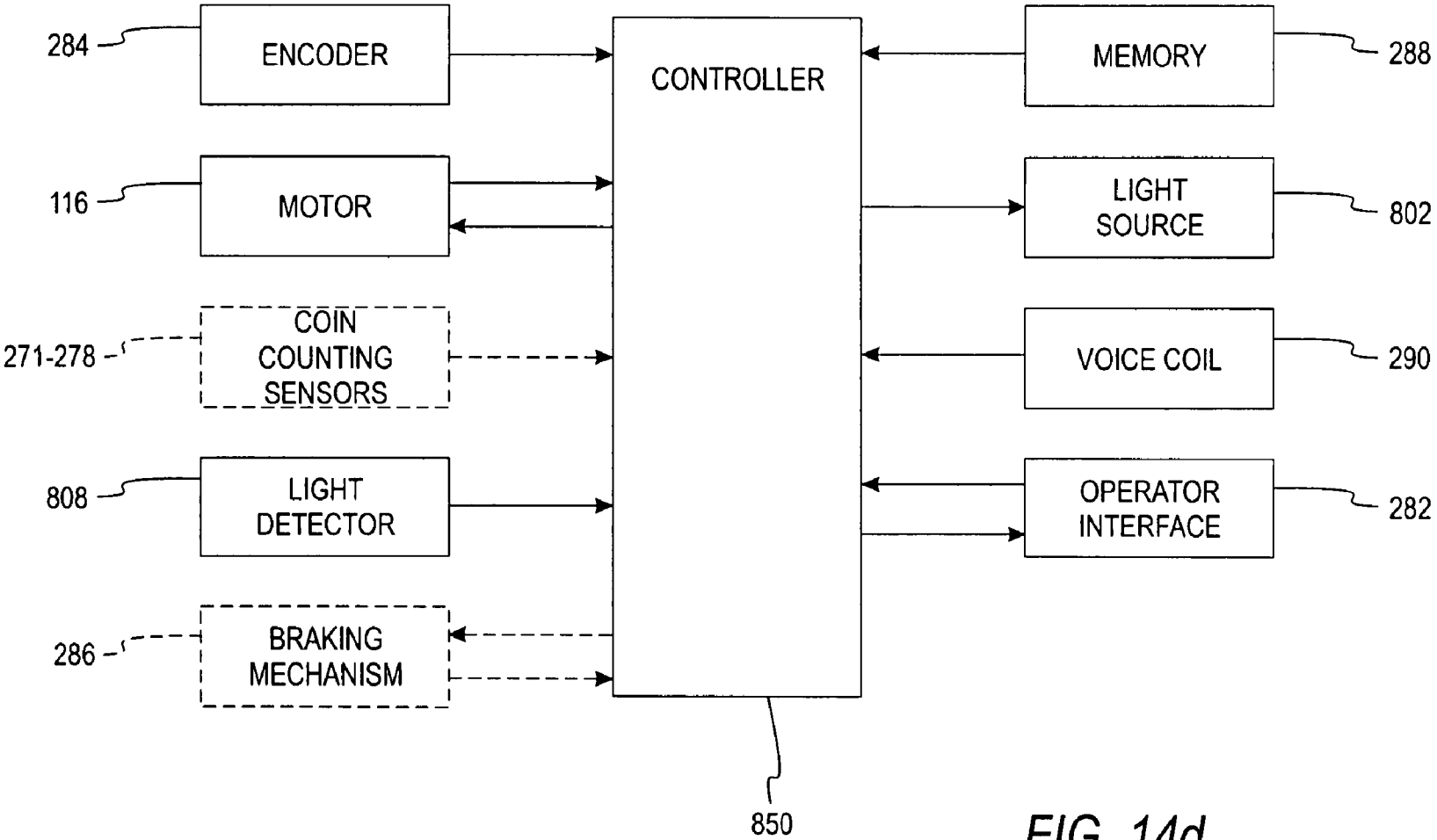
FIG. 14d is a functional block diagram of the control system for the a coin processing system shown in FIG. 1 using the sorting head of FIG. 14a. and an optical coin discrimination sensor according to one embodiment of the present invention.

Referring also to FIG. 14d, a control system, including a controller 850, for the coin processing system 100 using the sorting head 702 and optical coin discrimination sensor 700 is shown according to one embodiment of the present invention. The controller 850 controls the coin processing system 100 similar to that discussed above in connection with FIG. 6. The controller 850 of coin processing system 100 employing the optical coin discrimination sensor 700 controls the motor 116 and is optionally coupled to coin counting sensors 271-278 disposed in each of the coin exit channels 271-766 (not shown in FIG. 14a) and an optional braking mechanism 286. Further, the controller 850 is coupled to a memory 288 and an operator interface 282 for receiving information from and displaying information to a user of the coin processing system 100.

The controller 850 is also coupled to the encoder 284, the light detector 808, and the light source 802. The controller activates the light source 802 when activating the motor 116 for processing the coins according to one embodiment of the present invention. The light detector 808 generates a light-detection signal indicative of receiving the light beam output by the light source 802. The controller 850 receives the light-detection signal from the light detector 808. A plurality of different types of optical light detectors can be used in alternative embodiments of the present including photodetectors, CCD arrays, etc. According to one embodiment of the present invention, the light detector is a phototransistor commercially available from Optek Technology, Inc. of Carrollton, Tex. (Part No. OP805SL).

In the operation of the coin processing system 100, the controller's 850 receipt of the light-detection signal from the detector 808 informs the controller 850 that the first light guide 804 is not being covered by a passing coin. When a coin to be discriminated is moved passed the first light guide 804, the coin covers the first light guide and, thus, prevents light from the light source 802 from illuminating the light detector 808 during which the detector 808 does not output a light-detection signal indicating the detector 808 is detecting light.

According to one embodiment of the present invention, the light detector 808 outputs a voltage corresponding to the level of received light. If the signal drops blow a predetermined threshold voltage, the controller 850 determines that the light detector 808 is blocked by a passing coin. When the signal rises above the predetermined threshold, the controller 850 determines that the light detector 808 is not being blocked by a passing coin. A voltage comparator (not shown) electrically disposed between the light detector 808 and the controller 850 can be used to compare the signal generated by the light detector 808 to the predetermined threshold.

In another embodiment of the present invention, the detector 808 outputs an analog light-detection signal that is digitized by an analog-to-digital converter prior to being sent to the controller 850. The controller 850 samples this digitized signal at a rate on the order of tens of thousands of times per second depending on the resolution of the encoder 284 and the rotational speed of the disc 114. The sampled digitized signal is then compared by the controller 850 to a predetermined threshold value to determine whether a coin is blocking the light detector.

During the operation of the coin processing system 100, the controller 850 is also receiving pulses (e.g., encoder counts) from the encoder 284. As discussed above, each pulse from the encoder represents an incremental movement of the disc 114 (FIG. 1) that is rotating beneath the sorting head 702. According to one embodiment of the present invention, the encoder 284 has a resolution of about 20,000 pulses per revolution of the disk 114. In the illustrated embodiment of the sorting head 702 (FIG. 14a), the sorting head 702 has a diameter of about 11 inches and the input end of the first light guide 804 that receives light form the light source 802 is disposed about 4.44 inches from the center of the sorting head 702. This translates to each coin moving a distance of about 0.0014 inch past the first light guide 804 for each encoder pulse given the above-discussed specifications accordingly to one embodiment of the present invention.

Using the number of encoder pulses during which the controller 850 is not receiving the light-detection signal from the detector 808, the controller 850 determines the diameter of each passing coin, which can be used to discriminate the denomination of the coin. For example, in the U.S. coin set, each of the coins—pennies, nickels, dimes, quarters, half-dollar coins, and dollar coins—have a different diameter. Because the encoder has a high resolution according to one embodiment of the present invention, the controller 850 is capable of distinguishing between different denominations of coins that have a difference in diameter of at least about 0.0014 inch.

According to one embodiment of the present invention, the memory 288 of the coin processing system 100 has stored therein a master denominating characteristic information that includes the number of encoder pulses and the corresponding coin denominations that the system 100 is designed to process. The number of encoder pulses for each coin denomination corresponding to the size (e.g., the diameter) of each coin. This information maybe stored in the form of a look-up table (LUT). The master denominating information may also include an acceptable range of encoder counts, depending on the desired sensitivity, within which each coin denomination to be processed falls. During the processing of coins, the controller 850 compares the counted number of encoder pulses during which a light-detection signal from the light detector 808 is not received by the controller 850 and, then, compares that number to the stored numbers in the look up table to determine the denomination of each coin. If the counted number of encoder pulses does not favorably compare to a number, or a range of numbers, in the stored look up table, the coin is considered an invalid coin, and the controller 850 rejects the coin as described above.

Figure 15:
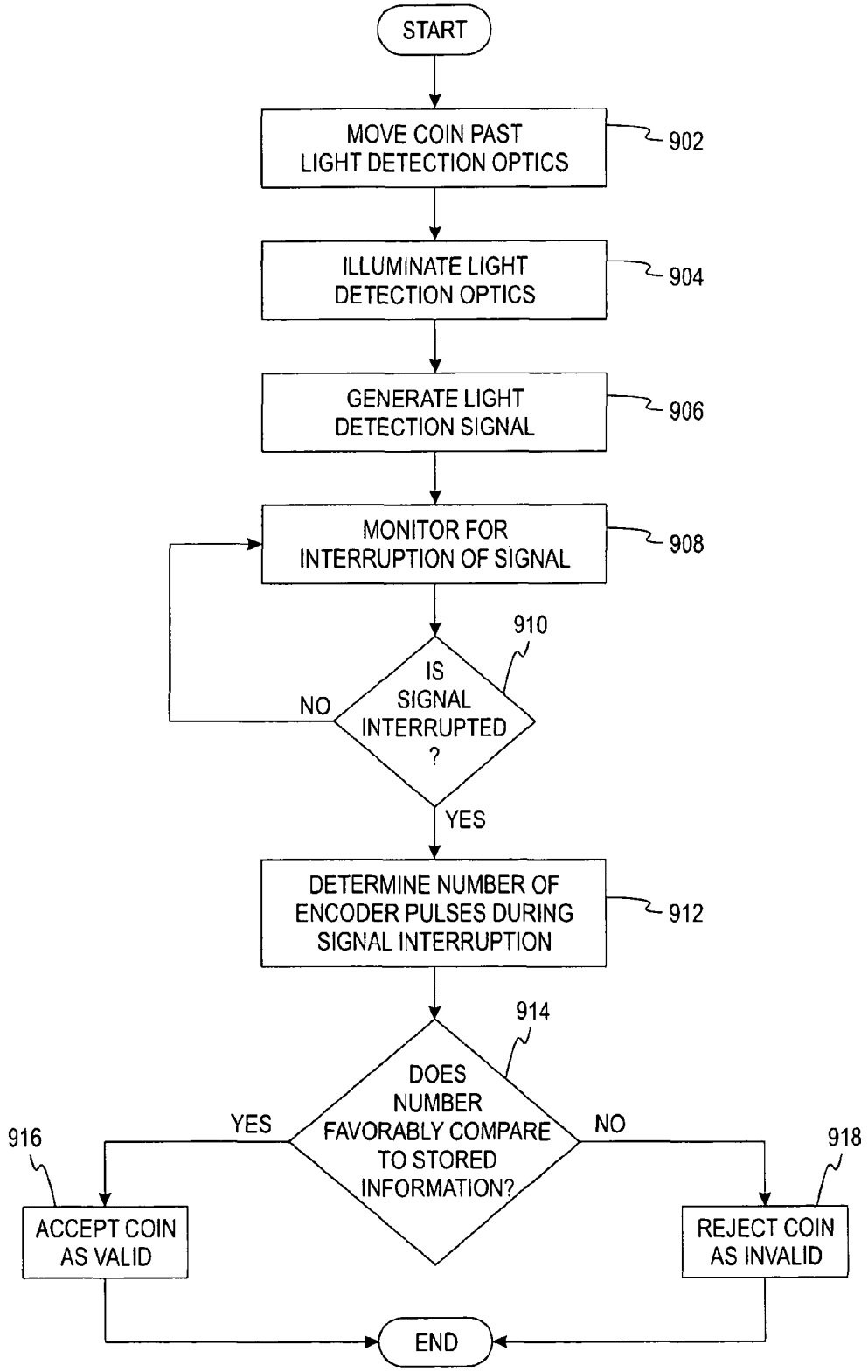
FIG. 15 is a flow chart illustrating a method for processing coins with the sorting head of FIGS. 14a-c and an optical coin discrimination sensor according to one embodiment of the present invention.

Turning to FIG. 15, a method for discriminating coins with the optical coin discrimination sensor 700 will be described according to one embodiment of the present invention. Initially, bulk coins are loaded into the coin processing system 100 and the coins are aligned within the queuing channel 770 of the sorting head 702 as described in connection with FIGS. 14a and 2. The L-shaped queuing channel 170 provides spacing between adjacent coins as described in connection with FIG. 2. As the disk 114 continues to rotate, each coin to be processed is moved along the queuing channel 770 past the light detection optics (e.g., the first light guide 804) at step 902.

At step 904, the light source 802 illuminates the light detection optics, which includes the first and second light guides 804, 806 and the light detector 808 according to one embodiment of the present invention. In other embodiments, a light detector may directly receive light emitted by a light source. In yet other alternative embodiments, one or a plurality of light directing members (e.g., light guides, optical fibers, etc.) may direct light to a light detector. The light detector 804 outputs, to the controller 850, a light-detection signal indicating that it is detecting light emitted by the light source 802 at step 906. To ensure the light detector is not receiving light from some other source (e.g., ambient light), the light detector may only detect light having a wavelength within a specific range, wherein the light source outputs light within that wavelength range, according to one embodiment of the present invention.

The controller 850 monitors the detector 804 for the light-detection signal at step 906. If there is no interruption in the light-detection signal (output by the detector 808) received by the controller 850 at step 910, the controller 850 continues to monitor the light-detection signal output by the detector 808 for an interruption in that signal at step 908. If, at step 910, an interruption in the light-detection signal output by the detector 880 is detected by the controller 850, the controller 850 determines the number of encoder pulses received from the encoder 284 (FIG. 14d) by the controller 850 during the period that the light-detection signal is interrupted at step 912. The determined number of encoder pulses is then compared to the stored master denominating characteristic information at step 915. If the determined number of encoder counts favorably compares with the stored information, the controller 850 determines the coin's denomination, and the coin is determined to be a valid coin at step 916. If the determined number of encoder counts does not favorably compare to the stored information, the controller 850 rejects the coins as an invalid coin at 918. The discrimination process is repeated for each coin.

According to one embodiment of the present invention, the controller 850 maintains a running count of the denominations of the accepted coins that are transported to and discharged by the coin exit channels 761-766 of the sorting head 702. In other embodiments, the optional coin counting sensors 271-278 (FIG. 14d) each maintain a count of coins discharged by the associated coin exit channel 761-766.

In an alternative embodiment of the present invention, the time period in which a light-detection signal is not received by the controller 850 from the detector 808 is used to discriminate the coins (rather than the number of encoder counts counted when the light-detection signal is not received). Put another way, the diameter of each coin is measured in time rather than encoder counts. The determined time period is then compared to master-denomination characteristic information stored in the memory 288, which include time periods obtained using known authentic coins. In such an embodiment, the rotational speed of the disc 114 at the time the master-denomination characteristic information is obtained should be substantially the same as that during the discriminating of coins.

Referring back to FIG. 9, an alternative embodiment of the optical coin discrimination senor will be described. As discussed in connection with FIG. 9, the queuing channel 404 is configured to move a portion of each coin beyond the outer periphery 404 of the sorting head 400. The optical sensor 406 serves as a light detector described above for detecting the presence of a light beam from a light source (not shown in FIG. 9). The light beam extends perpendicular to the page as viewed in FIG. 4 and is perpendicular to the surface of the coins being processed on the sorting head 400. When the coin is moved beyond the outer periphery 404 of the sorting head 400, the coin (shown in dashed lines) breaks the light beam extending between the optical sensor 406 and the light source. The controller 850 (FIG. 14d) tracks encoder pulses or time, as discussed above, during which the light-detection signal is not received from the optical sensor 406. The number of encoder pulses or time determined is then compared, by the controller 850, to the master-denominating information stored in memory for determining the coin's denomination similar to that discussed above. According to one embodiment of the present invention, because only a portion of each coin (e.g., less than half) extends beyond the outer periphery 404 of the sorting head 400, it is a chord of the coin being evaluated that is measured in terms of encoder counts or time. In other embodiments of the present invention where more than half of each coin extends beyond the outer periphery 404, the diameter of each coin can be measured in terms of encoder pulses or time.

While the invention is susceptible to various modifications and alternative forms, specific embodiments have been shown by way of example in the drawings and described in detail herein. It should be understood, however, that the invention is not intended to be limited to the particular forms disclosed. Rather, the invention is to cover all modifications, equivalents and alternatives falling within the spirit and scope of the invention as defined by the appended claims.

What is claimed is:

1. A coin processing system, comprising:

a continuously rotatable disc for imparting motion to a plurality of coins of mixed denominations, wherein a rate of rotation is adjustable;

an encoder attached to the rotatable disc for producing an encoder pulse for each incremental movement of the rotatable disc;

a memory adapted to store master denominating characteristic information including a plurality of predetermined numbers of encoder pulses, each predetermined number of encoder pulses corresponding to the size of a particular coin denomination the coin processing system is adapted to process;

a stationary sorting head having a lower surface generally parallel to and spaced slightly away from the rotatable disc, the lower surface forming a coin path for directing the movement of each of the coins and a coin exit region for sorting and discharging coins of particular denominations;

a light source for outputting a light beam along a first axis that traverses the coin path in substantially the same plane as the coin path;

a light detector for receiving the light beam along a second axis substantially perpendicular to the first axis, the light detector being adapted to generate a light-detection signal indicative of detecting the light beam, each coin moving along the coin path passing through the light beam resulting in the suspension of the generation of the light-detection signal; and a controller adapted to receive the encoder pulses from the encoder, the controller adapted to receive the light-detection signal from the light detector, the controller being adapted to determine the number of encoder pulses received during a period of non-receipt of the light-detection signal caused by each coin passing through the light beam, the controller being adapted to compare the determined number of encoder counts to the stored master denominating characteristic information upon resuming to receive the light-detection signal from the light detector.

2. The coin processing system of claim 1 wherein the controller is adapted to determine the denomination of the coin passing through the light beam when the determined number of encoder pulses favorably compares to the stored master denominating characteristic information.

3. The coin processing system of claim 1 wherein the light beam comprises a laser beam.

4. The coin processing system of claim 3 wherein the light source is a single laser diode.

5. The coin processing system of claim 1 wherein the light detector is a photodetector.

6. The coin processing system of claim 1 further comprising at least one light guide for guiding light received from the light source to the light detector.

7. The coin processing system of claim 6 wherein the light guide has an inlet disposed along the coin path opposite the light source.

8. The coin processing system of claim 1 further comprising a diverter disposed along the coin path beyond the light source, the diverter being moveable between a first position for permitting coins to proceed to a plurality of exit channels and a second position for diverting coins to a reject region.

9. The coin processing system of claim 8 wherein the controller causes the diverter to move from the first position to the second position when the number of encoder pulses determined when a coin passes through the light beam does not favorably compare to the stored master denominating characteristic information.

10. The coin processing system of claim 1, wherein the stationary sorting head lower surface forms a common coin path which directs the movement of all coins prior to sorting of coins having different denominations into separate coin paths for discharge from an exit region associated with a particular denomination, and wherein said light source is disposed to output a light beam that traverses the coin path at a point along such common coin path.

11. A method for processing coins with a coin processing system including at least one coin path and a plurality of coin exit regions for sorting and discharging coins of particular denominations, the system including a light source, disposed on one side of the coin path, comprising:

moving a coin along the coin path defined by a stationary sorting head of a high-speed coin processing machine at a rate that can be adjusted;

emitting a light beam along a first axis across the coin path in substantially the same plane as the coin path to a light detector disposed on another side of the coin path configured to receive the light beam along a second axis substantially perpendicular to the first axis;

interrupting, with the coin moving along a portion of the coin path between the light source and the light detector, the light beam traversing the coin path such that the light beam is not incident on the light detector;

counting, with [the] *a* controller, the number of encoder pulses generated by an encoder during the interruption of the light beam; and comparing the counted number of encoder pulses to a plurality of stored numbers of encoder pulses corresponding to the particular coin denominations.

12. The method of claim 11 wherein the light beam comprises a laser beam.

13. The method of claim 11 comprising determining the denomination of the coin when the counted number of encoder pulses favorably compares to one or more of a plurality of stored numbers of encoder pulses corresponding to the particular coin denominations.

14. The method of claim 11 comprising determining the coin to be an invalid coin when the counted number of encoder pulses does not favorably compare to a number of encoder pulses corresponding to a particular coin denomination.

15. The method of claim 14 comprising diverting the coin from the coin path when the coin is determined to be an invalid coin.

16. The method of claim 11 further comprising receiving the light beam with at least one light guide and directing the received light to the light detector.

17. The method of claim 11, further comprising:

generating at least a first signal event corresponding to an interruption of the light beam by a leading edge of the coin moving along the coin path;

generating at least a second signal event when the light beam is incident to the light detector following the act of the generating at least a first signal event;

counting a number of encoder pulses occurring between the acts of generating at least the first signal event and generating at least the second signal event; and comparing at least the counted number of encoder pulses to a plurality of stored numbers of encoder pulses corresponding to the particular coin denominations.

18. The method of claim 17 comprising determining the denomination of the coin when the counted number of encoder pulses favorably compares to a plurality of stored numbers of encoder pulses corresponding to the particular coin denominations.

19. The method of claim 17 comprising determining the coin to be an invalid coin when the counted number of encoder pulses does not favorably compare to a plurality of stored numbers of encoder pulses corresponding to the particular coin denominations.

20. The method of claim 19 comprising diverting the coin from the coin path when the coin is determined to be an invalid coin.

21. The method of claim 17 further comprising receiving the light beam with at least one light guide and directing the received light to the light detector.

22. The method of claim 11, further comprising:

generating a first light-detection output when the light beam traversing the coin path is incident upon the light detector; and generating a second light-detection output when the light beam traversing the coin path is not incident upon the light detector.

23. A method for determining the denomination of a coin with a disk-type coin processing system, comprising:

moving a plurality of coins along a coin path with a continuously rotatable disk, wherein a rate of rotation is adjustable;

generating an encoder pulse for each incremental movement of the continuously rotatable disk;

directing a light beam along a first axis to traverse the coin path in substantially the same plane as the coin path and toward a light detector configured to receive the light beam along a second axis substantially perpendicular to the first axis;

interrupting the light beam traversing the coin path for a period in which a coin of the plurality of coins is moving through the light beam traversing the coin path;

counting a number of encoder pulses occurring during the period; and comparing the counted number of encoder pulses to a plurality of stored numbers of encoder pulses corresponding to the particular coin denominations.

24. A method for determining the denomination of a coin with a disk-type coin processing system, comprising:

moving a plurality of coins along a coin path with a continuously rotatable disk, wherein a rate of rotation is adjustable;

generating an encoder pulse for each incremental movement of the continuously rotatable disk;

directing a light beam along a first axis to traverse the coin path in substantially the same plane as the coin path;

detecting the light beam with a light detector configured to receive the light beam along a second axis substantially perpendicular to the first axis;

developing a signal at the light detector indicating the presence of a coin of the plurality of coins in the coin path;

counting a number of encoder pulses occurring while developing the signal at the light detector; and comparing the counted number of encoder pulses to a plurality of stored numbers of encoder pulses corresponding to the particular coin denominations.

25. The method of claim 24 wherein developing further comprises:

generating a signal at the light detector that is proportional to the amount of detected light;

comparing the generated signal to a threshold value stored in memory; and determining the signal to be a signal indicating the presence of a coin in the coin path when the generated signal is below the threshold value.

26. The method of claim 25 wherein the generated signal is a voltage signal.

27. The method of claim 25, further comprising:

interrupting the light beam traversing the coin path for a period in which the coin is moving through the light beam traversing the coin path.

*28. The coin processing system of claim 1, wherein the light source is configured to output light within a predetermined range of wavelengths, and wherein the light detector is configured to only detect light having a wavelength within the predetermined range of wavelengths output by the light source.*

*29. The coin processing system of claim 1, further comprising an analog-to-digital converter configured to receive, as an input, an analog signal output by the light detector and configured to output, to the controller, a digitized light-detection signal.*

*30. The coin processing system of claim 1, wherein the encoder has a resolution of about 20,000 pulses per revolution of the rotatable disc.*

*31. The coin processing system of claim 1, wherein the stationary sorting head has a diameter of about 11 inches.*

*32. The coin processing system of claim 1, wherein the memory storing the master denominating characteristic information further comprises an acceptable range of encoder pulses for each coin denomination.*

*33. The coin processing system of claim 4, wherein the laser diode outputs light having a wavelength of about 623 nm.*

*34. The coin processing system of claim 6, further comprising:*

*an aperture in the sorting head adjacent the light guide;*

*a nozzle disposed in the aperture and directed toward the light guide; and*

*a pressurized air source connected to the nozzle,*

*wherein the nozzle is configured to discharge air onto the light guide.*

* * * * *